US012589306B2

(12) United States Patent
Bae et al.

(10) Patent No.: US 12,589,306 B2
(45) Date of Patent: Mar. 31, 2026

(54) IMAGE FRAME PROCESSING METHOD AND AN ELECTRONIC DEVICE SUPPORTING SAME

(71) Applicant: SAMSUNG ELECTRONICS CO., LTD., Suwon-si (KR)

(72) Inventors: Sujung Bae, Suwon-si (KR); Kyuwon Kim, Suwon-si (KR); Jongkyu Kim, Suwon-si (KR); Tushar Balasaheb Sandhan, Suwon-si (KR); Myoungho Lee, Suwon-si (KR); Heekuk Lee, Suwon-si (KR); Inho Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 267 days.

(21) Appl. No.: 18/215,531

(22) Filed: Jun. 28, 2023

(65) Prior Publication Data

US 2023/0338852 A1 Oct. 26, 2023

Related U.S. Application Data

(63) Continuation of application No. PCT/KR2021/019969, filed on Dec. 27, 2021.

(30) Foreign Application Priority Data

Dec. 28, 2020 (KR) ........................ 10-2020-0184976

(51) Int. Cl.
*A63F 13/56* (2014.01)
*A63F 13/52* (2014.01)
(Continued)

(52) U.S. Cl.
CPC .............. *A63F 13/56* (2014.09); *A63F 13/52* (2014.09); *G06F 3/14* (2013.01); *G06T 7/20* (2013.01)

(58) Field of Classification Search
CPC .......... A63F 13/20; A63F 13/25; A63F 13/40; A63F 13/45; A63F 13/52; A63F 13/56;
(Continued)

(56) References Cited

U.S. PATENT DOCUMENTS 8,403,757 B2 3/2013 Mizrachi
9,498,715 B2 11/2016 Kruglick
(Continued)

FOREIGN PATENT DOCUMENTS

JP 5481606 B1 4/2014
JP 2018161513 A 10/2018
(Continued)

OTHER PUBLICATIONS

International Search Report and Written Opinion for International Application No. PCT/KR2021/019969; International Filing Date Dec. 27, 2021; Date of Mailing Apr. 20, 2022; 6 Pages.

*Primary Examiner* — Omkar A Deodhar
(74) *Attorney, Agent, or Firm* — CANTOR COLBURN LLP

(57) ABSTRACT

An electronic device includes an input device, a display, a communication circuit, and a processor operatively connected to the input device, the display, and the communication circuit. The processor is configured to receive a first image frame from an external electronic device through the communication circuit; display the received first image frame, receive a first user input through the input device in a state in which the first image frame is displayed, predict a second user input on the basis of the first image frame and the first user input, generate a prediction input event corresponding to the predicted second user input, transmit information on the prediction input event to the external electronic device through the communication circuit, receive a second image frame according to the prediction input event (Continued)

from the external electronic device through the communication circuit and display the received second image frame.

17 Claims, 20 Drawing Sheets

(51) Int. Cl.
*G06F 3/14* (2006.01)
*G06T 7/20* (2017.01)

(58) Field of Classification Search
CPC ...... A63F 13/70; A63F 13/79; A63F 2300/30; A63F 2300/55; A63F 2300/60
See application file for complete search history.

(56) References Cited

U.S. PATENT DOCUMENTS

| | | | |
|---|---|---|---|
| 9,912,992 B2 | 3/2018 | Spracklen et al. | |
| 9,928,655 B1 | 3/2018 | Alston | |
| 9,933,901 B2 * | 4/2018 | Gasselin De Richebourg ............ A63F 13/2145 | |

| | | | |
|---|---|---|---|
| 10,376,784 B2 | 8/2019 | Chhaochharia et al. | |
| 11,090,566 B1 * | 8/2021 | Chow ..................... | A63F 13/75 |
| 11,531,835 B2 | 12/2022 | Lee | |
| 2014/0189091 A1 | 7/2014 | Tamasi et al. | |
| 2015/0134572 A1 | 5/2015 | Forlines et al. | |
| 2015/0156096 A1 | 6/2015 | Roh | |
| 2016/0001177 A1 | 1/2016 | Tsushima et al. | |
| 2019/0213975 A1 | 7/2019 | Nakata et al. | |
| 2020/0204821 A1 | 6/2020 | Kopietz | |
| 2020/0289937 A1 * | 9/2020 | Osman ................... | G06N 20/00 |
| 2022/0180602 A1 * | 6/2022 | Hao ........................ | G06T 11/00 |
| 2023/0094880 A1 * | 3/2023 | Zhang .................... | A63F 13/35 463/31 |
| 2023/0149819 A1 * | 5/2023 | Pandhare ............. | H04L 65/612 709/217 |

FOREIGN PATENT DOCUMENTS

| | | |
|---|---|---|
| JP | 2019017510 A | 2/2019 |
| KR | 20150062745 A | 6/2015 |
| KR | 20160058117 A | 5/2016 |
| KR | 20190115498 A | 10/2019 |
| WO | 2020180511 A1 | 9/2020 |

* cited by examiner

711 ~ First Image Frame

712 ~ Second Image Frame

713 ~ Additional Information Used for Training

720

Prediction Model

Prediction Second Image Frame ~ 731

Prediction Error ~ 732

Training

IMAGE FRAME PROCESSING METHOD AND AN ELECTRONIC DEVICE SUPPORTING SAME

CROSS-REFERENCE TO RELATED APPLICATIONS

This application is a continuation application, claiming priority under § 365(c), of International Application No. PCT/KR2021/019969, filed on Dec. 27, 2021, which is based on and claims the benefit of Korean patent application number 10-2020-0184976 filed on Dec. 28, 2020, in the Korean Intellectual Property Office, the disclosures of which are incorporated by reference herein in their entireties.

BACKGROUND

1) Field

Various embodiments of the disclosure relate to an image frame processing technology.

2) Description of the Related Arts

Recent development of network technologies has led to an increase in services through collaboration with external devices. For example, electronic devices, such as a smartphone, may be connected to a cloud server through a network and receive data, such as images, from the cloud server to provide various screens to a user.

As collaboration service through a cloud server becomes possible, attempts have been made to apply the cloud service to a gaming environment. A game service provider may prepare a game server for the cloud game service to support users to access the game server at any time or place to enjoy games. Accordingly, a game engine is executed in a cloud device and a game screen is rendered by the game engine, for example, image frames may be transmitted to the users' electronic devices through a network.

SUMMARY

In embodiments of an electronic device connected through a network to an external electronic device, such as a cloud server, depending on a network condition, display latency for an image frame or a phenomenon in which an image frame is not received and lost may occur. Specifically, when a game screen is changed according to a user input, for example, an input for operating a game character like the cloud game service and thus an image frame received from the cloud server is changed according to a user input as well, display latency may be caused by a load according to image frame generation and/or transmission of a generated image frame through a network.

Various embodiments of the disclosure may provide a method for generating a prediction image frame and processing an image frame to be displayed based on an image frame received from an external electronic device connected through a network and information for predicting a consecutive image frame and an electronic device (e.g., a user device) supporting the method.

An electronic device according to various embodiments of the disclosure may include an input device, a display, a communication circuit, and a processor operatively connected to the input device, the display, and the communication circuit, wherein the processor is configured to receive a first image frame from an external electronic device through the communication circuit, display the received first image frame through the display, receive a first user input through the input device in a state in which the first image frame is displayed, predict a second user input based on the received first image frame and the received first user input, generate a prediction input event corresponding to the predicted second user input, transmit information on the prediction input event to the external electronic device through the communication circuit, receive a second image frame according to the prediction input event from the external electronic device through the communication circuit, and display the received second image frame through the display.

An electronic device according to various embodiments of the disclosure may include an input device, a display, a communication circuit, and a processor operatively connected to the input device, the display, and the communication circuit, wherein the processor is configured to receive a first image frame from an external electronic device through the communication circuit, display the received first image frame through the display, receive a first user input through the input device in a state in which the first image frame is displayed, predict a second user input based on the received first image frame and the received first user input, generate a prediction input event corresponding to the predicted second user input, generate a prediction image frame based on the generated prediction input event, and display the prediction image frame through the display.

An image frame processing method of an electronic device according to various embodiments of the disclosure may include receiving a first image frame from an external electronic device through a communication circuit of the electronic device, displaying the received first image frame through a display of the electronic device, receiving a first user input through an input device of the electronic device in a state in which the first image frame is displayed, predicting a second user input based on the received first image frame and the received first user input, generating a prediction input event corresponding to the predicted second user input, transmitting information on the prediction input event to the external electronic device through the communication circuit, receiving a second image frame according to the prediction input event from the external electronic device through the communication circuit, and displaying the received second image frame through the display.

An electronic device includes an input device, a display and a processor connected to the input device and the display, wherein the processor is configured to receive a first image frame from an external electronic device, display the received first image frame through the display, receive a first user input through the input device, predict a second user input based on the first image frame and the first user input, generate a prediction input event corresponding to the second user input, generate a second image frame based on the prediction input event and display the second image frame through the display.

According to various embodiments of the disclosure, latency or drop of an image frame may be prevented by generating and displaying a prediction image frame.

In addition, various effects directly or indirectly identified through the disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 14 is a graph illustrating a method for determining the number of generations of prediction image frames based on a user input according to an;

DETAILED DESCRIPTION

Figure 1:
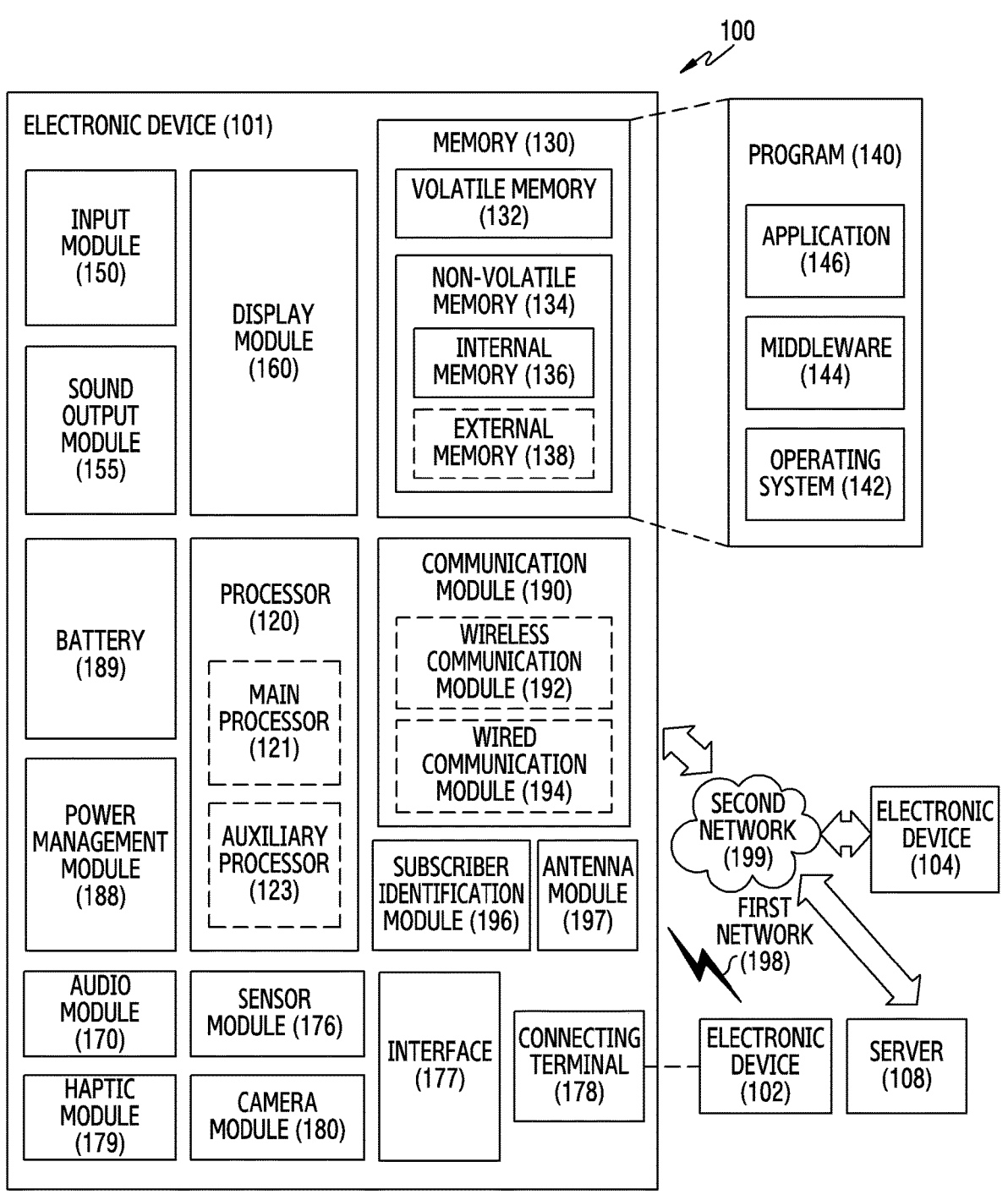
FIG. 1 is a block diagram illustrating an electronic device in a network environment according to various embodiments.

Hereinafter, various embodiments of the disclosure will be described with reference to accompanying drawings. However, these are not intended to limit the disclosure to a specific embodiment and should be understood as including various modifications, equivalents, or alternatives of embodiments of the disclosure. For convenience of explanation, the size of the elements shown in the drawings may be exaggerated or reduced, but the disclosure is not necessarily limited by the drawings.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), and/or at least one of an electronic device 104 and/or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments, at least one of the components (e.g., the connecting terminal 178) may be omitted from the electronic device 101, and/or one or more other components may be added in the electronic device 101. In some embodiments, some of the components (e.g., the sensor module 176, the camera module 180, and/or the antenna module 197) may be implemented as a single component (e.g., the display module 160).

In an embodiment, the processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and/or store resulting data in non-volatile memory 134. According to an embodiment, the processor 120 may include a main processor 121 (e.g., a central processing unit (CPU) or an application processor (AP)), and/or an auxiliary processor 123 (e.g., a graphics processing unit (GPU), a neural processing unit (NPU), an image signal processor (ISP), a sensor hub processor, and/or a communication processor (CP)) that is operable independently from, and/or in conjunction with, the main processor 121. For example, when the electronic device 101 includes the main processor 121 and the auxiliary processor 123, the auxiliary processor 123 may be adapted to consume less power than the main processor 121, and/or to be specific to a specified function. The auxiliary processor 123 may be implemented as separate from, and/or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 may be in an inactive (e.g., sleep) state, and/or together with the main processor 121 while the main processor 121 may be in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 and/or via a separate server (e.g., the server 108). Learning algorithms may include, but are not limited to, e.g., supervised learning, unsupervised learning, semi-supervised learning, and/or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network and/or a combination of two or more thereof but is not limited thereto. The artificial intelligence model may, additionally or alternatively, include a software structure other than the hardware structure.

In an embodiment, the memory 130 may store various data used by at least one component (e.g., the processor 120 or the sensor module 176) of the electronic device 101. The various data may include, for example, software (e.g., the program 140) and/or input data and/or output data for a command related thereto. The memory 130 may include the volatile memory 132 and/or the non-volatile memory 134.

In an embodiment, the program 140 may be stored in the memory 130 as software, and/or may include, for example, an operating system (OS) 142, middleware 144, and/or an application 146.

In an embodiment, the input module 150 may receive a command and/or data to be used by another component (e.g., the processor 120) of the electronic device 101, from the outside (e.g., a user) of the electronic device 101. The input module 150 may include, for example, a microphone, a mouse, a keyboard, a key (e.g., a button), and/or a digital pen (e.g., a stylus pen).

In an embodiment, the sound output module 155 may output sound signals to the outside of the electronic device 101. The sound output module 155 may include, for example, a speaker and/or a receiver. The speaker may be used for general purposes, such as playing multimedia and/or playing record. The receiver may be used for receiving incoming calls. According to an embodiment, the receiver may be implemented as separate from, and/or as part of the speaker.

In an embodiment, the display module 160 may visually provide information to the outside (e.g., a user) of the electronic device 101. The display module 160 may include, for example, a display, a hologram device, and/or a projector and control circuitry to control a corresponding one of the display, hologram device, and/or projector. According to an embodiment, the display module 160 may include a touch sensor adapted to detect a touch, and/or a pressure sensor adapted to measure the intensity of force incurred by the touch.

The audio module 170 may convert a sound into an electrical signal and vice versa. According to an embodiment, the audio module 170 may obtain the sound via the input module 150, and/or output the sound via the sound output module 155 and/or a headphone of an external electronic device (e.g., an electronic device 102) directly (e.g., hard wired) and/or wirelessly coupled with the electronic device 101.

In an embodiment, the sensor module 176 may detect an operational state (e.g., power and/or temperature) of the electronic device 101 and/or an environmental state (e.g., a state of a user) external to the electronic device 101, and then generate an electrical signal and/or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

In an embodiment, the interface 177 may support one or more specified protocols to be used for the electronic device 101 to be coupled with the external electronic device (e.g., the electronic device 102) directly (e.g., hard wired) and/or wirelessly. According to an embodiment, the interface 177 may include, for example, a high definition multimedia interface (HDMI), a universal serial bus (USB) interface, a secure digital (SD) card interface, and/or an audio interface.

In an embodiment, a connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, and/or an audio connector (e.g., a headphone connector).

In an embodiment, the haptic module 179 may convert an electrical signal into a mechanical stimulus (e.g., a vibration and/or a movement) and/or an electrical stimulus which may be recognized by a user via a tactile sensation or kinesthetic sensation. According to an embodiment, the haptic module 179 may include, for example, a motor, a piezoelectric element, and/or an electric stimulator.

The camera module 180 may capture a still image or moving images. According to an embodiment, the camera module 180 may include one or more lenses, image sensors, image signal processors, and/or flashes.

The power management module 188 may manage power supplied to the electronic device 101. According to one embodiment, the power management module 188 may be implemented as at least part of, for example, a power management integrated circuit (PMIC).

In an embodiment, the battery 189 may supply power to at least one component of the electronic device 101. According to an embodiment, the battery 189 may include, for example, a primary cell which is not rechargeable, a secondary cell which is rechargeable, and/or a fuel cell. The electronic device 101 may also be powered via a plug-in power cord.

In an embodiment, the communication module 190 may support establishing a direct (e.g., wired) communication channel and/or a wireless communication channel between the electronic device 101 and the external electronic device (e.g., the electronic device 102, the electronic device 104, or the server 108) and/or performing communication via the established communication channel. The communication module 190 may include one or more communication processors that may be operable independently from the processor 120 (e.g., the application processor (AP)) and/or that supports a direct (e.g., wired) communication or a wireless communication. According to an embodiment, the communication module 190 may include a wireless communication module 192 (e.g., a cellular communication module, a short-range wireless communication module, and/or a global navigation satellite system (GNSS) communication module) and/or a wired communication module 194 (e.g., a local area network (LAN) communication module or a power line communication (PLC) module). A corresponding one of these communication modules may communicate with the external electronic device via the first network 198 (e.g., a short-range communication network, such as Personal Area Networking, wireless-fidelity (Wi-Fi) direct, or infrared data association (IrDA)) and/or the second network 199 (e.g., a long-range communication network, such as a legacy cellular network, a 5G network, a next-generation communication network, the Internet, and/or a computer network (e.g., LAN or wide area network (WAN)). These various types of communication modules may be implemented as a single component (e.g., a single chip), and/or may be implemented as multi components (e.g., multi chips) separate from each other. The wireless communication module 192 may identify and authenticate the electronic device 101 in a communication network, such as the first network 198 and/or the second network 199, using subscriber information (e.g., international mobile subscriber identity (IMSI)) which may be stored in the subscriber identification module 196.

In an embodiment, the wireless communication module 192 may support a 5G network, after a 4G network, and next-generation communication technology, e.g., new radio (NR) access technology. The NR access technology may support enhanced mobile broadband (eMBB), massive machine type communications (mMTC), and/or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, and/or large scale antenna. The wireless communication module 192 may support various requirements specified in the electronic device 101, an external electronic device (e.g., the electronic device 104), and/or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), and/or a round trip of 1ms or less) for implementing URLLC.

In an embodiment, the antenna module 197 may transmit and/or receive a signal and/or power to and/or from the outside (e.g., the external electronic device) of the electronic device 101. According to an embodiment, the antenna module 197 may include an antenna including a radiating element composed of a conductive material and/or a conductive pattern formed in and/or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 and/or the second network 199, may be selected, for example, by the communication module 190 (e.g., the wireless communication module 192) from the plurality of antennas. The signal and/or the power may then be transmitted and/or received between the communication module 190 and the external electronic device via the selected at least one antenna.

According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, and/or adjacent to the first surface and may be capable of supporting a designated high-frequency band (e.g., the mmWave band), and/or a plurality of antennas (e.g., array antennas) disposed on a second surface (e.g., the top or a side surface) of the printed circuit board, and/or adjacent to the second surface and/or capable of transmitting and/or receiving signals of the designated high-frequency band.

At least some of the above-described components may be coupled mutually and/or communicate signals (e.g., commands or data) therebetween via an inter-peripheral communication scheme (e.g., a bus, general purpose input and output (GPIO), serial peripheral interface (SPI), and/or mobile industry processor interface (MIPI)).

According to an embodiment, commands and/or data may be transmitted and/or received between the electronic device 101 and the external electronic device 104 via the server 108 coupled with the second network 199. Each of the electronic devices 102 and/or 104 may be a device of a same type as, or a different type, from the electronic device 101. According to an embodiment, all or some of the operations that are to be executed at the electronic device 101 may be executed at one or more of the external electronic devices 102, 104, and/or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform at least part of the function or the service requested, and/or an additional function and/or an additional service related to the request, and/or transfer an outcome of the performing to the electronic device 101. In an embodiment, the electronic device 101 may provide the outcome, with or without further processing of the outcome, as at least part of a reply to the request. To that end, a cloud computing, distributed computing, mobile edge computing (MEC), and/or client-server computing technology may be used, for example. The electronic device 101 may provide ultra low-latency services using, e.g., distributed computing and/or mobile edge computing. In another embodiment, the external electronic device 104 may include an internet-of-things (IoT) device. The server 108 may be an intelligent server using machine learning and/or a neural network. According to an embodiment, the external electronic device 104 and/or the server 108 may be included in the second network 199. The electronic device 101 may be applied to intelligent services (e.g., smart home, smart city, smart car, or healthcare) based on 5G communication technology and/or IoT-related technology.

Figure 2:
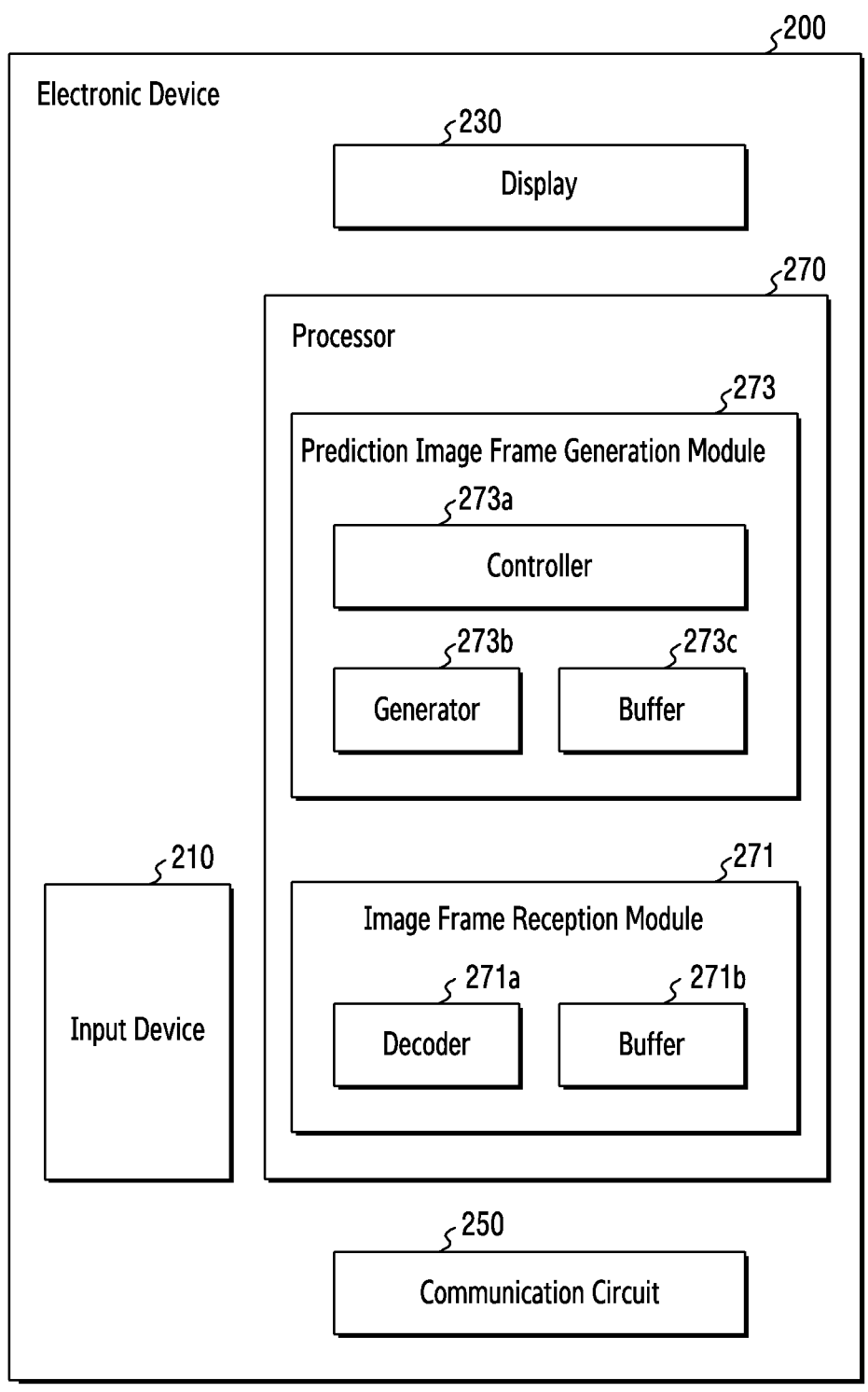
FIG. 2 is a block diagram illustrating a configuration of an electronic device related to image frame processing according to an embodiment.

FIG. 2 is a block diagram illustrating a configuration of an electronic device related to image frame processing according to an embodiment.

In the case that an image frame is received and displayed while being connected to an external electronic device (e.g., the electronic device 300 in FIG. 3), such as a cloud server, through a network, depending on a network condition, display latency for an image frame received from the external electronic device may occur or a phenomenon in which an image frame to be received from the external electronic device is not received and thus is lost may occur. Furthermore, in the case that a game screen is changed according to a user input for operating a game character like the cloud game service and thus an image frame received from an external electronic device is changed according to a user input as well, display latency may be caused by a load according to image frame generation and/or transmission of a generated image frame through a network.

In an embodiment, and in order to prevent the display latency and/or drop of an image frame, the electronic device 200 (e.g., the electronic device 101 in FIG. 1) may generate and/or display a prediction image frame based on an image frame and information for predicting an image frame (a next image frame in sequence) consecutive to the image frame received from the external electronic device connected to the electronic device through a network. Accordingly, a user may not recognize display latency and/or drop of an image frame.

In an embodiment and referring to FIG. 2, the electronic device 200 for supporting the aforementioned function may include an input device 210 (e.g., the input module 150 in FIG. 1), a display 230 (e.g., the display module 160 in FIG. 1), a communication circuit 250 (e.g., the communication module 190 in FIG. 1), and/or a processor 270 (e.g., the processor 120 in FIG. 1). However, the configuration of the electronic device 200 is not limited thereto. According to various embodiments, the electronic device 200 may include at least one other component in addition to the above-described components. By way of example, the electronic device 200 may further include a memory (e.g., the memory 130 in FIG. 1) for storing data processed through the processor 270 and/or data received from an external electronic device through the communication circuit 250.

In an embodiment, the input device 210 may receive a command or data to be used for a component (e.g., the processor 270) of the electronic device 200 from the outside (e.g., a user) of the electronic device 200. The input device 210 may include, for example, a microphone, a mouse, a keyboard, a key (e.g., a button), and/or a digital pen (e.g., a stylus pen). According to an embodiment, in the case that the electronic device 200 corresponds to a head mounted device (HMD) worn on the head of a user, the input device 210 may include a sensor mounted to the HMD, and/or a user input received through the input device 210 may include an input (e.g., an input obtained by moving the head of the user wearing the HMD) corresponding to a motion of the HMD measured by the sensor. According to another embodiment, the input device 210 may include a sensor mounted to an auxiliary device (e.g., a (gaming) stick) linked with the electronic device 200. In this case, the user input received through the input device 210 may include an input (e.g., an input obtained from a user grabbing a gaming stick and shaking and/or moving the gaming stick) corresponding to a motion of the auxiliary device measured through the sensor.

In an embodiment, the display 230 may display various contents (e.g., a text, an image, a video, an icon, and/or a symbol, etc.) to a user. According to an embodiment, the display 230 may display an image frame received from an external electronic device through the communication circuit 250. According to another embodiment, the display 230 may display a prediction image frame generated through the processor 270. The display 230 may include a touch screen and/or receive, for example, a touch input using an electronic pen and/or a portion of the user's body, a gesture input, a proximity input and/or a hovering input.

Figure 3:
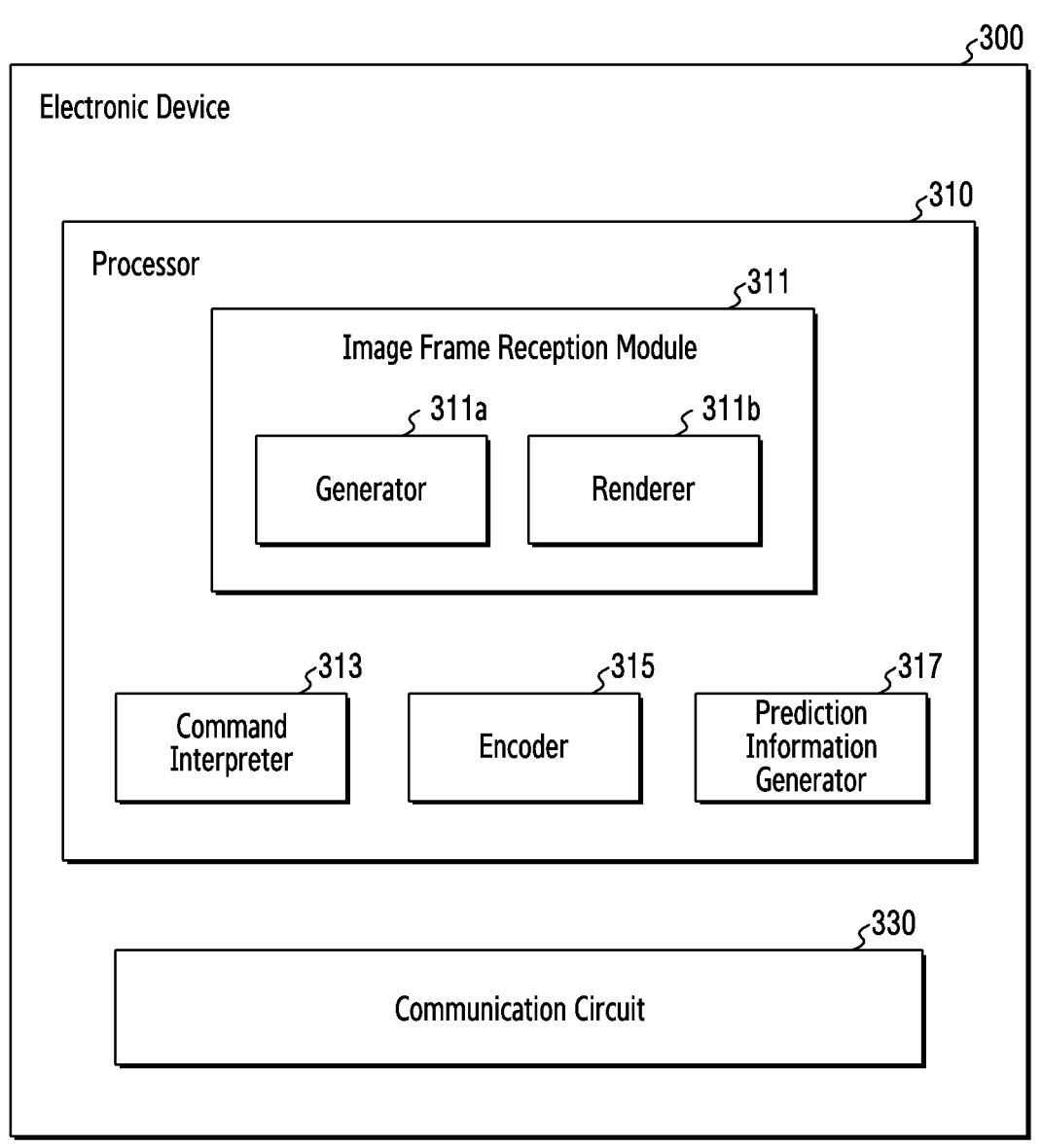
FIG. 3 is a block diagram illustrating a configuration of an external electronic device related to image frame processing according to an embodiment.

In an embodiment, the communication circuit 250 may support communication between the electronic device 200 and/or an external electronic device (e.g., the electronic device 300 in FIG. 3). For example, the electronic device 200 may transmit and/or receive a command and/or data to and/or from the external electronic device through the communication circuit 250. According to an embodiment, the display 200 may receive at least one image frame from the external electronic device through the communication circuit 250. According to another embodiment, the display 200 may receive at least one image frame and/or information for predicting an image frame consecutive to the received image frame, from the external electronic device through the communication circuit 250. For example, the display 200 may receive, from the external electronic device through the communication circuit 250, a first image frame and/or information for predicting a second image frame consecutive to the first image frame. In this case, the information for predicting the second image frame may include at least one of vector information on a motion of an object area included in the received first image frame, vector information on a motion of points within the object area, information on key points detected in the first image frame, information on points of the second image frame corresponding to the key points detected in the first image frame (or, transformation matrix (rotation and translation information) for detecting corresponding points), key frame (e.g., an I-Frame) information corresponding to the second image frame, information on an area to be changed in the second image frame, segmentation mask information used for distinguishing an object and a background in the first image frame (and/or the second image frame), and/or optical flow information in a changed area between the first image frame and the second image frame, but is not limited to the described methods. In an embodiment, the information for predicting the second image frame may have a data amount relatively smaller than that of the second image frame, and thus may be received relatively faster than the second image frame. For example, the information on the area to be changed among the information for predicting the second image frame may include coordinate values of an upper left end and lower right end of the area and/or the amount of information representing one area may be 16 bytes. Furthermore, other information included in the information for predicting the second image frame may be transmitted by using lower resolution than that of the second image frame and thus may have a relatively small data amount to be transmitted than that for transmitting the second image frame.

In an embodiment, the processor 270 may control at least one other component of the electronic device 200 and/or may perform various data processing and/or calculations. For example, the processor 270 may execute instructions for controlling operations of the input device 210, the display 230, and/or the communication circuit 250.

In an embodiment, the processor 270 may include an image frame reception module 271 and/or a prediction image frame generation module 273. The image frame reception module 271 may correspond to a component for receiving an image frame from an external electronic device through the communication circuit 250, and/or the prediction image frame generation module 273 may correspond to a component for generating and/or displaying a prediction image frame in the case that there is display latency and/or drop of an image frame received from the electronic device. At least a portion of the image frame reception module 271 and/or the prediction image frame generation module 273 may be included in the processor 270 as a hardware component and/or a software component.

The image frame reception module 271 may receive at least one image frame from an external electronic device through the communication circuit 250. According to another embodiment, the image frame reception module 271 may receive at least one image frame and/or information for predicting an image frame consecutive to the image frame, from the external electronic device through the communication circuit 250. In this case, the at least one image frame may indicate an image frame received from the external electronic device, and the image frame consecutive to the at least one image frame may indicate an image frame to be received (not received yet) from the external electronic device and/or may indicate an image frame corresponding to the next order of the received at least one image frame in display order. Hereinafter, for the convenience of description, the received at least one image frame will be described as a first image frame and the image frame consecutive to the received at least one image frame will be described as a second frame. According to an embodiment, the first image frame and the second image frame may configure a screen of a designated game. For example, the first image frame and the second image frame may represent game screens which change as the game progresses.

According to an embodiment, the image frame reception module 271 may include a decoder 271a for decoding the first image frame received from the external electronic device and/or a buffer 271b for storing the decoded first image frame. The image frame reception module 271 may transfer the decoded first image frame to the prediction image frame generation module 273. According to an embodiment, although not illustrated in the drawing, a buffer 271b may be included outside the processor 270 (e.g., the memory 130 of FIG. 1).

According to an embodiment, the prediction image frame generation module 273 may include a controller 273a which monitors display latency and/or drop of an image frame, and/or to control the generation of a prediction image frame in the case that display latency or drop of an image frame occurs, a generator 273b for generating the prediction image frame, and/or a buffer 273c for storing the generated prediction image frame. The controller 273a may store the decoded first image frame received from the image frame reception module 271 in the buffer 273c. According to an embodiment, although not illustrated in the drawing, the buffer 273c may be included outside the processor 270 (e.g., the memory 130 of FIG. 1).

The controller 273a may monitor display latency and/or drop of an image frame. According to an embodiment, the controller 273a may determine whether there is display latency and/or drop of the second image frame, based on at least one of traffic information of a network through the communication circuit 250, a reception time of the first image frame, and/or meta information of the first image frame. In this case, the meta information of the first image frame may include a generation time of the first image frame and/or a generation time of the second image frame. In addition, the generation time of the first image frame and/or the generation time of the second image frame may include a value configured by the external electronic device. By way of example, the controller 273a may monitor latency and/or drop of reception of the second image frame based on the traffic information of the network. For another example, the controller 273a may monitor latency and/or drop of reception of the second image frame based on the reception time of the first image frame received from the external electronic device, the generation time of the first image frame included in the meta information of the first image frame, and/or the generation time of the second image frame.

According to an embodiment, assuming that the reception time of the first image frame received from the external electronic device is a first time t1, and the generation time of the first image frame and the generation time of the second image frame included in the meta information of the first image frame are a second time t2 and a third time t3, respectively, in this case that a sum (tr_d+c) of a difference value (tr_d=t1−t2) between the first time and the second time and a time value c required to generate a prediction image frame is smaller than or equal to a difference value (t3−t2) (e.g., one frame time interval) between the second time and the third time, the controller 273a may generate and/or display a prediction image frame for a user not to recognize latency time (e.g., zero-latency). According to another embodiment, in the case that a sum (tr_d+c) of a difference value (tr_d=t1−t2) between the first time and the second time and a time value c required to generate a prediction image frame is greater than a difference value (t3−t2) (e.g., one frame time interval) between the second time and the third time, the controller 273a may generate and/or display a prediction image frame so that a user recognizes a latency time to some extent but receives an effect of increasing the number of frames output per time (FPS) (reduced latency).

In the case of determining that display latency and/or drop of an image frame occurs, the controller 273a may control the generator 273b to generate a prediction image frame with respect to the second image frame. According to an embodiment, the controller 273a may determine whether to generate the prediction image frame based on an artificial intelligence-based learning model (e.g., a confidence model). For example, the controller 273a may determine a confidence level for prediction success probability of the generator 273b through the confidence model. In this case, an input value of the confidence model may include information (including input history information (e.g., information on n inputs input at a previous time point)) on a user input received through the input device 210 and/or the received first image frame (including history information (e.g., information on n image frames received at a previous time point) of a received image frame). For example, since a prediction confidence level may be lowered in the case that a user inputs multiple times in a short period of time (e.g., in case that a key is pressed multiple times in a short period of time or a screen is touched multiple times in a short period of time), user input information changes rapidly (e.g., in case that an input coordinate value changes greatly or a width of a mouse drag is large), and/or an image change between received image frames is very large in a state in which the first image frame is displayed, whether to generate the predicted image frame may be determined through the confidence model using the received user input information and/or the received first image frame as input values. According to an embodiment, the controller 273a may control the generator 273b to not generate the prediction image frame in the case that a confidence level value output through the confidence model is less than a designated value, and control the generator 273b to generate the prediction image frame in case that a confidence level value is greater than or equal to a designated value.

According to an embodiment, the controller 273a may determine the number of the prediction image frames to be generated based on at least one of display latency time of the second image frame and/or the number of the received user's inputs. For example, the controller 273a may determine how much the display latency for an image frame may be reduced in a current state, and/or determine the generation number of the prediction image frames. For example, the controller 273a may configure a parameter so that the generator 273b operates in zero latency in the case that processing is possible for a user not to recognize the latency time, and/or configure a parameter so that the generator 273b operates in reduced latency in the case that recognition of the latency time is not prevented for a threshold value or more. In an embodiment, the configured parameter may include, for example, at least a portion of the number of prediction image frames, an index (e.g., a displaying order) of the prediction image frame, a time interval (e.g., a time interval from the first image frame) for each prediction image frame, an index of the first image frame used for generating the prediction image frame, and/or a display time (timestamp) of the prediction image frame.

In an embodiment, the generator 273b may generate a prediction image frame for the second image frame. In addition, the generator 273b may store the generated prediction image frame in the buffer 273c. According to an embodiment, the generator 273b may generate the prediction image frame based on at least one of the received first image frame and/or information for predicting the second image frame. According to another embodiment, the generator 273b may generate the second image frame based on information for predicting the second image frame and/or a received user input (e.g., including input history information (e.g., information on n inputs input at a previous time point)). According to an embodiment, the generator 273b may predict a third image frame based on the predicted second image frame. The information for predicting the second image frame may include at least one of vector information on a motion of an object area included in the received first image frame, vector information on a motion of points within the object area, information on key points detected in the first image frame, information on points of the second image frame corresponding to the key points detected in the first image frame (or, transformation matrix (rotation and translation information) for detecting corresponding points), key frame (e.g., an I-Frame) information corresponding to the second image frame, information on an area to be changed in the second image frame, segmentation mask information used for distinguishing an object and a background in the first image frame (and/or the second image frame), and/or optical flow information in a changed area between the first image frame and the second image frame, but is not limited to the described methods.

According to an embodiment, the generator 273b may generate the prediction image frame based on an artificial intelligence-based learning model (e.g., a generation model (regression model)). Here, an input value of the generation model may include at least one of the received first image frame and/or information for predicting the second image frame. According to an embodiment, a user input may be used as the input value of the generation model. The generation model may be referred to as a prediction model.

According to an embodiment, in the case that the first image frame and the second image frame configure a screen of a designated game, the processor 270 may tune the generation model based on an artificial intelligence-based learning model (e.g., an adjustment model) using characteristic information of the designated game as an input value. In this embodiment, the adjustment model may learn a motion of an object according to characteristic information (e.g., a game title, a game genre, or key images representing a game) of the designated game and/or characteristics of an image frame, and/or may output a parameter to which a predicted motion of an object and/or a characteristic of an image frame are reflected according to the first image frame when the first image frame is input. In this case, the processor 270 may tune the generation model by using the obtained parameter to generate a prediction image frame specified for the designated game through the generation model.

According to an embodiment, the processor 270 may transmit information on a user input received through the input device 210 to the external electronic device through the communication circuit 250. Furthermore, the processor 270 may receive the second image frame to which the user input is applied from the external electronic device through the communication circuit 250. For example, the processor 270 may receive, from the external electronic device, the second image frame having changed according to the user input which is input in a state in which the first image frame is displayed.

According to an embodiment, in the case that the second image frame is received from the external electronic device, the processor 270 may compare and/or analyze the received second image frame and the generated prediction image frame and/or apply the comparison and/or analysis result to the generation model to train the generation model. For example, the processor 270 may continuously train the generation model by using the actually received second image frame and/or the prediction image frame for the second image frame.

According to an embodiment, the processor 270 may evaluate a quality of the generated prediction image frame. For example, the processor 270 may evaluate a quality of the generated prediction image frame based on a degree of blur, and/or the presence or absence of artifacts of the generated prediction image frame. According to another embodiment, the processor 270 may evaluate whether the prediction image frame is identical or similar to an actual image frame generated by an application (e.g., a game application) by using a trained model discriminator for evaluating the generated prediction image frame and/or an evaluation result may be used as an indicator of quality evaluation. According to an embodiment, in case that the quality is lower than or equal to a designated value, the processor 270 may delete the generated prediction image frame so that the generated prediction image frame is not displayed. For example, the processor 270 may delete all prediction image frames having qualities lower than or equal to a designated value among prediction image frames stored in the buffer 273c.

According to an embodiment, the processor 270 may display the image frames stored in the buffer 273c through the display 230 in accordance with a display time of each of the image frames. By way of example, the processor 270 may display, through the display 230, the first image frame stored in the buffer 273c at a first time and the prediction image frame stored in the buffer 273c at a second time. Furthermore, in the case that the second image frame is received from the external electronic device to be stored in the buffer 273c, the processor 270 may display the second image frame at a third time through the display 230. According to an embodiment, the processor 270 may display the generated prediction image frames at a generation time of the second image frame included in meta information of the first image frame through the display 230.

FIG. 3 is a block diagram illustrating a configuration of an external electronic device related to image frame processing according to an embodiment. The electronic device 300 shown in FIG. 3 may be a device connected to the electronic device 200 shown in FIG. 2 through a network. According to an embodiment, the electronic device 200 shown in FIG. 2 may correspond to a client device and the electronic device 300 shown in FIG. 3 may correspond to a server device (e.g., a cloud server). For example, the electronic device shown in FIG. 2 may correspond to an HMD device and the electronic device shown in FIG. 3 may correspond to a smart device paired with the HMD.

In an embodiment and referring to FIG. 3, the electronic device 300 may include a processor 310 and a communication circuit 330. The communication circuit 330 may support communication between the electronic device 300 and an external electronic device (e.g., the electronic device 200 in FIG. 2). For example, the electronic device 300 may transmit and/or receive a command and/or data to and/or from the external electronic device through the communication circuit 330. According to an embodiment, the display 300 may transmit at least one image frame to the external electronic device through the communication circuit 330. According to another embodiment, the display 300 may transmit at least one image frame and/or information for predicting an image frame consecutive to the transmitted image frame, to the external electronic device through the communication circuit 330.

In an embodiment, the processor 310 may control at least one other component of the electronic device 300 and/or may perform various data processing and/or calculations. For example, the processor 310 may execute instructions for controlling operations of the communication circuit 330.

In an embodiment, the processor 310 may include an image frame generation module 311, a command interpreter 313, an encoder 315, and/or a prediction information generator 317. At least a portion of the image frame generation module 311, the command interpreter 313, the encoder 315, and/or the prediction information generator 317 may be included in the processor 310 as a hardware component or a software component.

In an embodiment, the image frame generation module 311 may include a generator 311a for generating an image frame and/or a renderer 311b for rendering a generated image frame. In case that an image frame to be generated configures a game screen, the image frame generation module 311 may generate an image frame based on a game logic (or game algorithm).

In an embodiment, the command interpreter 313 may process a user input received through the communication circuit 330. For example, the command interpreter 313 may convert the received user input into an instruction according to the game logic. Accordingly, the generator 311a may generate an image frame based on the instruction.

In an embodiment, the prediction information generator 317 may generate information for predicting an image frame (the second image frame) consecutive to at least one image frame (the first image frame) transmitted to the external electronic device through the communication circuit 330. The information for predicting the second image frame may include at least one of vector information on a motion of an object area included in the received first image frame, vector information on a motion of points within the object area, information on key points detected in the first image frame, information on points of the second image frame corresponding to the key points detected in the first image frame (and/or, transformation matrix (rotation and translation information) for detecting corresponding points), key frame (e.g., an I-Frame) information corresponding to the second image frame, information on an area to be changed in the second image frame, segmentation mask information used for distinguishing an object and/or a background in the first image frame (and/or the second image frame), and/or optical flow information in a changed area between the first image frame and the second image frame, but is not limited to the described methods. The information for predicting the image frame (the second image frame) may have a data amount relatively smaller than that of the image frame, and thus may be transmitted relatively faster than the image frame. For example, the information on the area to be changed among the information for predicting the image frame may include coordinate values of an upper left end and lower right end of the area and/or the amount of information representing one area may be 16 bytes. Furthermore, other information included in the information for predicting the image frame may be transmitted by using resolution lower than that of the image frame and/or thus may have a relatively small data amount to be transmitted than that for transmitting the image frame.

As described above, according to various embodiments, an electronic device (e.g., the electronic device 200 in FIG. 2) may include an input device (e.g., the input device 210 in FIG. 2), a display (e.g., the display 230 in FIG. 2), a communication circuit (e.g., the communication circuit 250 in FIG. 2), and/or a processor (e.g., the processor 270 in FIG. 2) operatively connected to the input device, the display, and/or the communication circuit, wherein the processor may be configured to receive a first image frame and/or information for predicting an image frame consecutive to the first image frame from an external electronic device through the communication circuit, display the received first image frame through the display, receive a user input through the input device after the first image frame is displayed, determine whether display latency for the second image frame occurs, generate a prediction image frame for the second image frame based on the received information and/or the received user input in case of determining that display latency for the second image frame occurs, and display the generated prediction image frame through the display.

According to various embodiments, the information may include at least one of vector information on a motion of an object included in the received first image frame, information on a key frame corresponding to the second image frame, information on an area to be changed in the second image frame, segment mask information capable of distinguishing an object and a background within the first image frame, segment mask information capable of distinguishing an object and/or a background within the second image frame, and/or optical flow information in a changed area between the first image frame and the second image frame.

According to various embodiments, the processor may be configured to determine whether display latency for the second image frame occurs based on at least one of traffic information of a network through the communication circuit, a reception time of the first image frame, and/or meta information of the first image frame, and/or the meta information of the first image frame may include a generation time of the first image frame and/or a generation time of the second image frame.

According to various embodiments, the processor may be configured to determine the number of the prediction image frames to be generated based on a display latency time of the second image frame and/or the number of the received user's inputs.

According to various embodiments, the processor may be configured to display the generated prediction image frames at a generation time of the second image frame included in meta information of the first image frame through the display.

According to various embodiments, the processor may be configured to generate the prediction image frame based on an artificial intelligence-based first learning model by using the received information and/or the received user input.

According to various embodiments, the processor may be configured to transmit information on the user input to the external electronic device through the communication circuit, receive the second image frame to which the user input is applied from the external electronic device through the communication circuit, and/or apply a result from comparison and/or analysis of the received second image frame and/or the generated prediction image to the first learning model.

According to various embodiments, the processor may be configured to, in the case that the first image frame and the second image frame configure a screen of a designated game, obtain a parameter to which a motion of a predicted object and/or a characteristic of an image frame according to input of the first image frame are applied through an artificial intelligence-based second learning model having learned a motion of an object according to characteristic information of the designated game and/or a characteristic of an image frame, and/or tune the first learning model by using the obtained parameter.

According to various embodiments, the processor may be configured to determine whether to generate the prediction image frame through an artificial intelligence-based learning model using information on the user input as an input value.

According to various embodiments, the processor may be configured to evaluate a quality of the generated prediction image frame and/or delete the generated prediction image frame so that the generated prediction image frame is not displayed in case that the quality is lower than or equal to a designated value.

Figure 4:
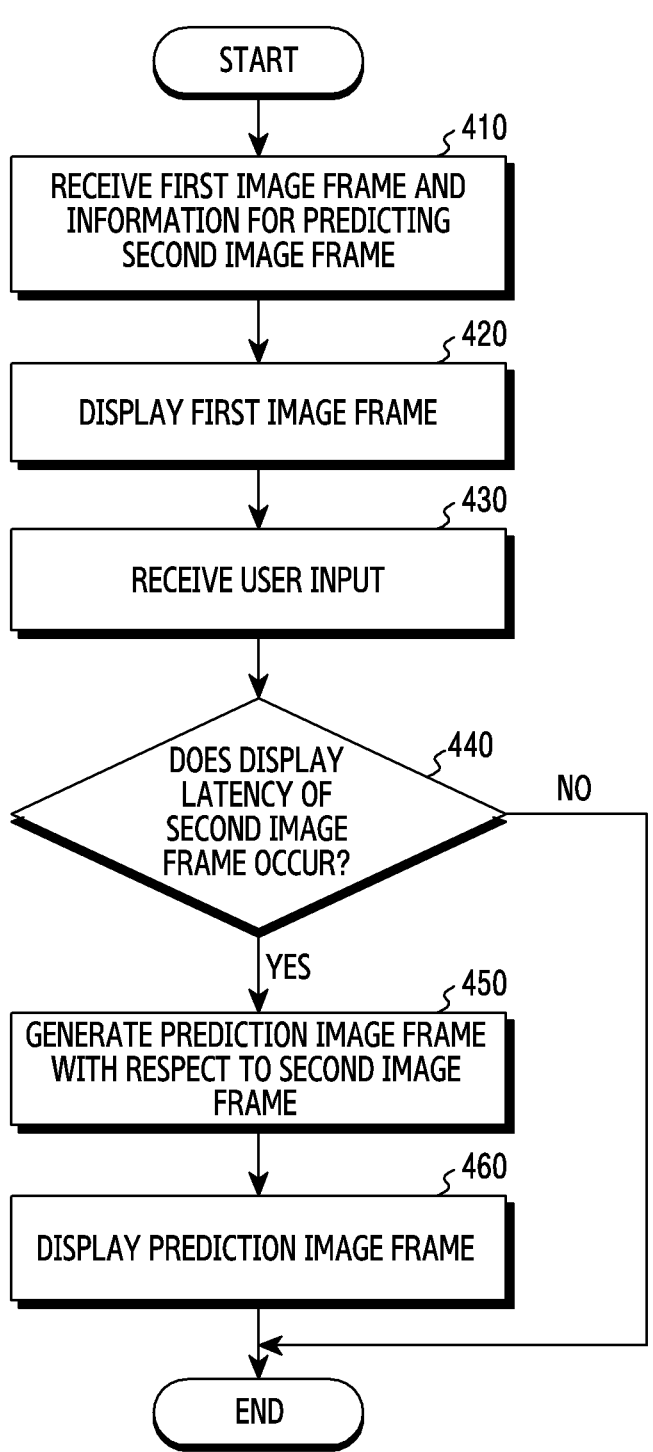
FIG. 4 is a block diagram illustrating a method of an electronic device for processing image frame display latency according to an embodiment.

FIG. 4 is a flow diagram illustrating an operation method of an electronic device for processing image frame display latency according to an embodiment.

In an embodiment and referring to FIG. 4, as shown in operation block 410, a processor (e.g., the processor 270 in FIG. 2) of an electronic device (e.g., the electronic device 200 in FIG. 2) may receive a first image frame and information for predicting a second image frame consecutive to the first image frame from an external electronic device (e.g., the electronic device 300 in FIG. 3) through a communication circuit (e.g., the communication circuit 250 in FIG. 2). The information for predicting the second image frame may include at least one of vector information on a motion of an object area included in the received first image frame, vector information on a motion of points within the object area, information on key points detected in the first image frame, information on points of the second image frame corresponding to the key points detected in the first image frame (or, transformation matrix (rotation and translation information) for detecting corresponding points), key frame (e.g., an I-Frame) information corresponding to the second image frame, information on an area to be changed in the second image frame, segmentation mask information used for distinguishing an object and a background in the first image frame (and/or the second image frame), and/or optical flow information in a changed area between the first image frame and the second image frame, but is not limited to the described methods.

As shown in operation block 420, the processor may display the received first image frame through a display (e.g., the display 230 in FIG. 2). According to an embodiment, the processor may display the received first image frame on the display to correspond to a display time of the received first image frame.

As shown in operation block 430, the processor may receive a user input through an input device (e.g., the input device 210 in FIG. 2) in a state in which the first image frame is displayed. According to an embodiment, the input device may include a microphone, a mouse, a keyboard, a key (e.g., a button), and/or a digital pen (e.g., a stylus pen). According to another embodiment, in the case that the electronic device corresponds to a HMD worn on the head of a user, the input may include a sensor mounted to the HMD, and a user input received through the input device may include an input (e.g., an input obtained by moving the head of the user wearing the HMD) corresponding to a motion of the HMD measured by the sensor. According to still another embodiment, the input device may include a sensor mounted to an auxiliary device (e.g., a (gaming) stick) linked to the electronic device, and/or the user input received through the input device may include an input (e.g., an input obtained from a user grabbing a gaming stick and shaking or moving the gaming stick) corresponding to a motion of the auxiliary device measured through the sensor.

As shown in operation block 440, the processor may determine whether display latency for the second image frame occurs. According to an embodiment, the processor may monitor display latency of an image frame. For example, the processor may determine whether display latency of the second image frame occurs, based on at least one of traffic information of a network through the communication circuit, a reception time of the first image frame, and/or meta information of the first image frame. In this case, the meta information of the first image frame may include a generation time of the first image frame and/or a generation time of the second image frame.

In an embodiment, in the case of determining that display latency of the second image frame does not occur, the processor may end operations of processing display latency of an image frame. In the case of determining that display latency of the second image frame occurs, the processor may generate a prediction image frame for the second image frame as shown in operation block 450. According to an embodiment, the processor may generate the prediction image frame based on at least one of the received first image frame and information for predicting the second image frame. According to another embodiment, the processor may generate the second image frame based on information for predicting the second image frame and/or a received user input.

According to an embodiment, the processor may generate the prediction image frame based on an artificial intelligence-based learning model (e.g., a generation model (regression model)). Here, an input value of the generation model may include at least one of the received first image frame or information for predicting the second image frame. According to an embodiment, a user input (including input history information (e.g., information on n inputs input at a previous time point)) may be used as the input value of the generation model.

As shown in operation block 460, the processor may display the generated prediction image frame through the display. According to an embodiment, the processor may display the generated prediction image frames at a generation time of the second image frame included in meta information of the first image frame through the display.

According to various embodiments, at least one of operation 410 to operation 460 may be performed to overlap another operation at least partially in time and/or may be performed in an order different from the described order.

Figure 5:
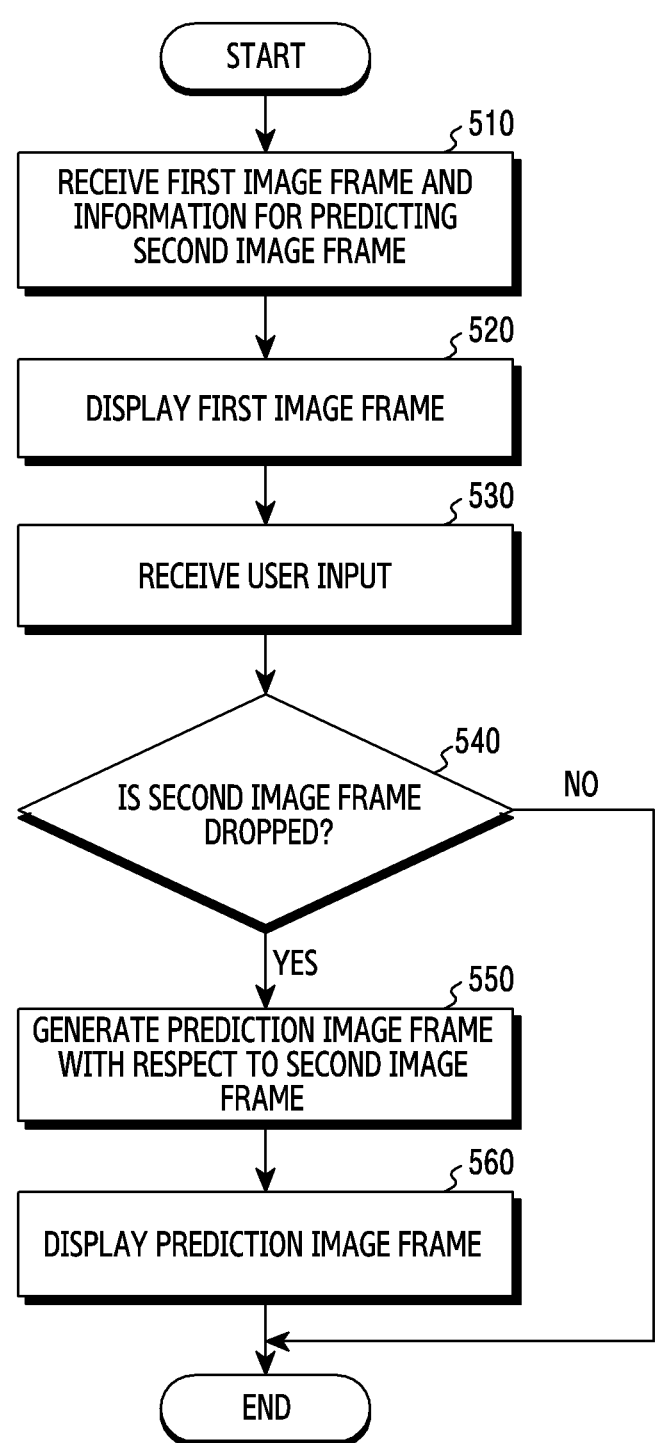
FIG. 5 is a block diagram illustrating a method of an electronic device for processing an image frame drop according to an embodiment.

FIG. 5 is a flow diagram illustrating an operation method of an electronic device for processing an image frame drop according to an embodiment.

In an embodiment and referring to FIG. 5, as shown in operation block 510, a processor (e.g., the processor 270 in FIG. 2) of an electronic device (e.g., the electronic device 200 in FIG. 2) may receive a first image frame and information for predicting a second image frame consecutive to the first image frame from an external electronic device (e.g., the electronic device 300 in FIG. 3) through a communication circuit (e.g., the communication circuit 250 in FIG. 2). The information for predicting the second image frame may include at least one of vector information on a motion of an object area included in the received first image frame, vector information on a motion of points within the object area, information on key points detected in the first image frame, information on points of the second image frame corresponding to the key points detected in the first image frame (or, transformation matrix (rotation and translation information) for detecting corresponding points), key frame (e.g., an I-Frame) information corresponding to the second image frame, information on an area to be changed in the second image frame, segmentation mask information used for distinguishing an object and a background in the first image frame (and/or the second image frame), and/or optical flow information in a changed area between the first image frame and the second image frame, but is not limited to the described methods.

As shown in operation block 520, the processor may display the received first image frame through a display (e.g., the display 230 in FIG. 2). According to an embodiment, the processor may display the received first image frame on the display to correspond to a display time of the received first image frame.

As shown in operation block 530, the processor may receive a user input through an input device (e.g., the input device 210 in FIG. 2) in a state in which the first image frame is displayed. According to an embodiment, the input device may include a microphone, a mouse, a keyboard, a key (e.g., a button), and/or a digital pen (e.g., a stylus pen). According to another embodiment, in the case that the electronic device corresponds to a HMD worn on the head of a user, the input may include a sensor mounted to the HMD, and a user input received through the input device may include an input (e.g., an input obtained by moving the head of the user wearing the HMD) corresponding to a motion of the HMD measured by the sensor. According to still another embodiment, the input device may include a sensor mounted to an auxiliary device (e.g., a (gaming) stick) linked to the electronic device, and the user input received through the input device may include an input (e.g., an input obtained from a user grabbing a gaming stick and/or shaking or moving the gaming stick) corresponding to a motion of the auxiliary device measured through the sensor.

As shown in operation block 540, the processor may determine whether the second image frame is dropped. According to an embodiment, the processor may monitor a drop of an image frame. For example, the processor may determine whether the second image frame is dropped, based on at least one of traffic information of a network through the communication circuit, and/or whether the second image frame is received within a designated time after the first image frame is received.

In an embodiment, in the case of determining that the second image frame is not dropped, the processor may end operations of processing a drop of an image frame. In case of determining that the second image frame is dropped, the processor may generate a prediction image frame for the second image frame as shown in operation block 550. According to an embodiment, the processor may generate the prediction image frame based on at least one of the received first image frame and information for predicting the second image frame. According to another embodiment, the processor may generate the second image frame based on information for predicting the second image frame and a received user input.

According to an embodiment, the processor may generate the prediction image frame based on an artificial intelligence-based learning model (e.g., a generation model (regression model)). In this case, an input value of the generation model may include at least one of the received first image frame or information for predicting the second image frame. According to an embodiment, a user input (including input history information (e.g., information on n inputs input at a previous time point)) may be used as the input value of the generation model.

As shown in operation block 560, the processor may display the generated prediction image frame through the display. According to an embodiment, the processor may display the generated prediction image frames at a generation time of the second image frame included in meta information of the first image frame through the display.

According to various embodiments, at least one of operation 510 to operation 560 may be performed to overlap another operation at least partially in time and/or may be performed in an order different from the described order.

As described above, according to various embodiments, an image frame processing method of an electronic device (e.g., the electronic device 200 in FIG. 2) may include receiving a first image frame and information for predicting a second image frame consecutive to the first image frame from an external electronic device through a communication circuit (e.g., the communication circuit 250 in FIG. 2) of the electronic device, as shown in operation block 410 in FIG. 4, displaying the received first image frame through a display (e.g., the display 230 in FIG. 2) of the electronic device, as shown in operation block 420 in FIG. 4, receiving a user input through an input device (e.g., the input device 210 in FIG. 2) of the electronic device after the first image frame is displayed, as shown in operation block 430 in FIG. 4, determining whether display latency of the second image frame occurs, as shown in operation block 440 in FIG. 4, generating a prediction image frame for the second image frame based on the received information and the received user input in case of determining that the display latency of the second image frame occurs, as shown in operation block 450 in FIG. 4, and displaying the generated prediction image frame through the display, as shown in operation block 460 in FIG. 4.

According to various embodiments, the information may include at least one of vector information on a motion of an object included in the received first image frame, information on a key frame corresponding to the second image frame, information on an area to be changed in the second image frame, segment mask information capable of distinguishing an object and a background within the first image frame, segment mask information capable of distinguishing an object and a background within the second image frame, and/or optical flow information in a changed area between the first image frame and the second image frame.

According to various embodiments, the operation of determining whether display latency occurs may include an operation of determining whether display latency for the second image frame occurs based on at least one of traffic information of a network through the communication circuit, a reception time of the first image frame, and meta information of the first image frame, and the meta information of the first image frame may include a generation time of the first image frame and/or a generation time of the second image frame.

According to various embodiments, the image frame processing method may further include an operation of determining the number of the prediction image frames to be generated based on a display latency time of the second image frame and/or the number of the received user's inputs.

According to various embodiments, the operation of displaying the generated prediction image frame may include an operation of displaying the generated prediction image frames at a generation time of the second image frame included in meta information of the first image frame through the display.

According to various embodiments, the operation of generating a prediction image frame may include an operation of generating the prediction image frame based on an artificial intelligence-based first learning model by using the received information and/or the received user input.

According to various embodiments, the image frame processing method may further include an operation of transmitting information on the user input to the external electronic device through the communication circuit, an operation of receiving the second image frame to which the user input is applied from the external electronic device through the communication circuit, and/or an operation of applying a result from comparison and/or analysis of the received second image frame and/or the generated prediction image to the first learning model.

According to various embodiments, the image frame processing method may further include, in the case that the first image frame and the second image frame configure a screen of a designated game, an operation of obtaining a parameter to which a motion of a predicted object and/or a characteristic of an image frame according to input of the first image frame may be applied through an artificial intelligence-based second learning model having learned a motion of an object according to characteristic information of the designated game and/or a characteristic of an image frame, and an operation of tuning the first learning model by using the obtained parameter.

According to various embodiments, the image frame processing method may further include an operation of determining whether to generate the prediction image frame through an artificial intelligence-based learning model using information on the user input as an input value.

According to various embodiments, the image frame processing method may further include an operation of evaluating a quality of the generated prediction image frame and/or an operation of deleting the generated prediction image frame so that the generated prediction image frame is not displayed in the case that the quality is lower than or equal to a designated value.

Figure 6:
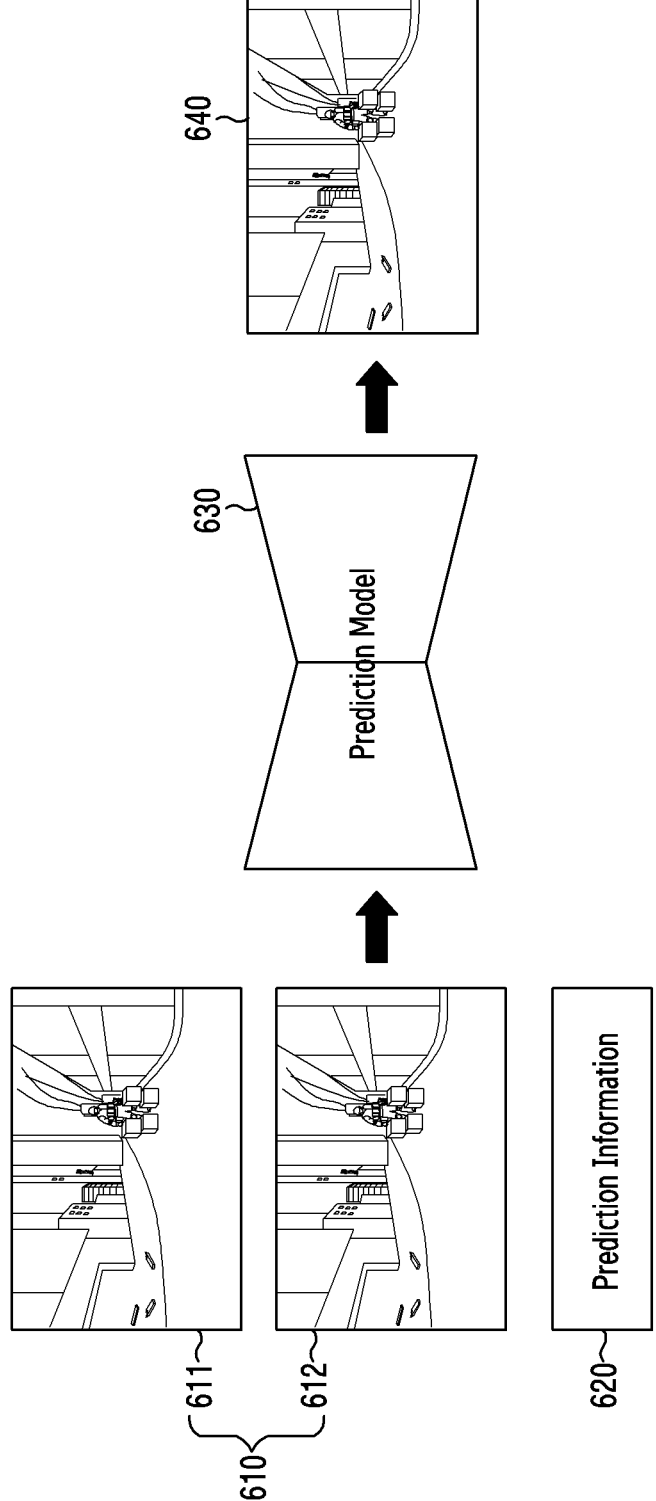
FIG. 6 is a block diagram illustrating a prediction image frame generation method through a trained prediction model according to an embodiment.

FIG. 6 is a block diagram illustrating a prediction image frame generation method through a trained prediction model according to an embodiment.

Referring to FIG. 6, a processor (e.g., the processor 270 in FIG. 2) of an electronic device (e.g., the electronic device 200 in FIG. 2) may generate a prediction image frame 640 based on an artificial intelligence-based trained prediction model 630 (e.g., a generation model (regression model)). In this case, an input value of the prediction model 630 may include at least one of at least one image frame 610 (a first image frame) received from an external electronic device (e.g., the electronic device 300 in FIG. 3) through a communication circuit (e.g., the communication circuit 250 in FIG. 2) and prediction information 620 for predicting an image frame (a second image frame) consecutive to the at least one image frame 610. FIG. 6 illustrates the case in which two image frames 611 and 612 are used as an input of the prediction model 630 but the disclosure is not limited thereto. According to an embodiment, one image frame, 611 or 612, may be used as an input of the prediction model 630. According to an embodiment, a user input (including input history information (e.g., information on n inputs input at a previous time point)) may be used as the input value of the prediction model 630.

According to an embodiment, the prediction information 620 may include at least one of vector information on a motion of an object included in the received first image frame 610, information on a key frame (e.g., I-Frame) corresponding to the second image frame, information on an area to be changed in the second image frame, segment mask information capable of distinguishing an object and/or a background within the first image frame (and/or the second image frame), and/or optical flow information in a changed area between the first image frame and the second image frame.

According to an embodiment, the prediction image frame 640 generated through the prediction model 630 may be stored in a buffer (e.g., the buffer 273c in FIG. 2) together with the first frame received through the communication circuit. An image frame stored in the buffer may include at least one of an index, image data, a generation time of an image frame (e.g., the first image frame or the prediction image frame), a generation time of a next image frame (e.g., the second image frame), a reception time of an image frame (e.g., the first image frame), and a display time.

Figure 7:
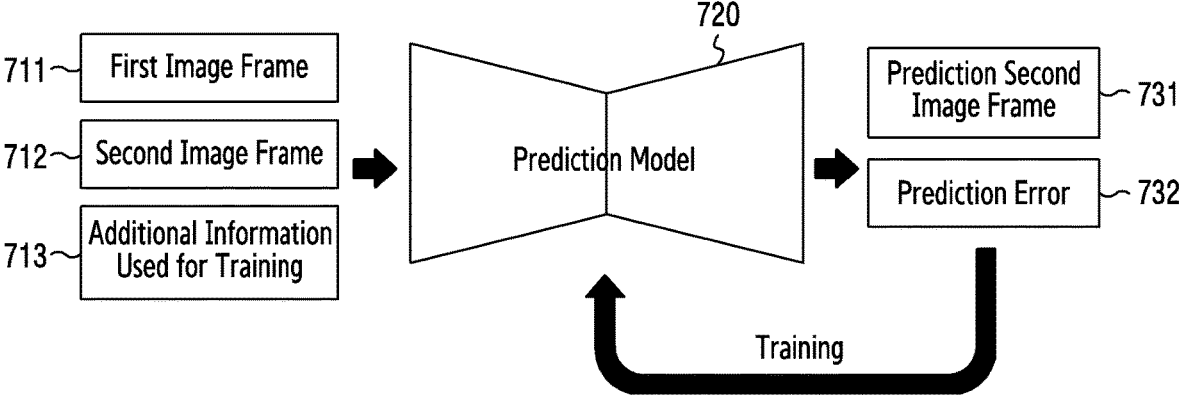
FIG. 7 is a block diagram illustrating a training method of a prediction model according to an embodiment.

FIG. 7 is a block diagram illustrating a training method of a prediction model according to an embodiment.

In an embodiment and referring to FIG. 7, a processor (e.g., the processor 270 in FIG. 2) of an electronic device (e.g., the electronic device 200 in FIG. 2) may generate a prediction image frame (a predicted second image frame) 731 based on an artificial intelligence-based trained prediction model 720 (e.g., a generation model 630 in FIG. 6). For example, the processor may generate a prediction image frame 731 to be displayed at a second time by using an image frame (the first image frame) 711 received at a first time. Thereafter, the processor may receive an actual image frame (e.g., the second image frame) 712 to be displayed at the second time from an external electronic device through a communication circuit (e.g., the communication circuit 250 in FIG. 2). In this case, the second image frame 712 may correspond to ground truth data. For example, the processor may compare and/or analyze the received second image frame 712 and/or the generated prediction image frame 731, and train the prediction model 720 by applying a comparison and/or analysis result (predicted error) 732 to the prediction model 720.

According to an embodiment, the prediction model 720 may be trained in a learning server and distributed to a user device to be used. In this case, image frames 711 and 712 and additional information 713 to be used for training may be prepared in advance and used in training.

According to an embodiment, the additional information 713 may be used as an input value of the prediction model

720. By way of example, the additional information 713, like the prediction information 620 in FIG. 6, may include information for predicting the second image frame 712 consecutive to the first image frame 711 received from the external electronic device through the communication circuit. For example, the additional information 713 may include at least one of vector information on a motion of an object included in the first image frame 711, information on a key frame (e.g., I-Frame) corresponding to the second image frame 712, information on an area to be changed in the second image frame 712, segment mask information capable of distinguishing an object and/or a background within the first image frame (and/or the second image frame), and/or optical flow information in a changed area between the first image frame 711 and the second image frame 712. For another example, in the case that the first image frame 711 configures a screen of a designated game, the additional information 713, like the parameter 860 in FIG. 8, may include information output at least partially based on an artificial intelligence-based learning model (e.g., the learning model 850 in FIG. 8) using characteristic information (e.g., the game characteristic information 840 in FIG. 8) of the designated game as an input value. For example, the additional information 713 may include information to which a motion of an object according to characteristic information (e.g., a game title, a game genre, and/or key images representing a game) and/or a characteristic of an image frame are applied. Furthermore, the additional information 713 may include user input information, for example, information on n inputs that may be input by the user during a designated time.

Figure 8:
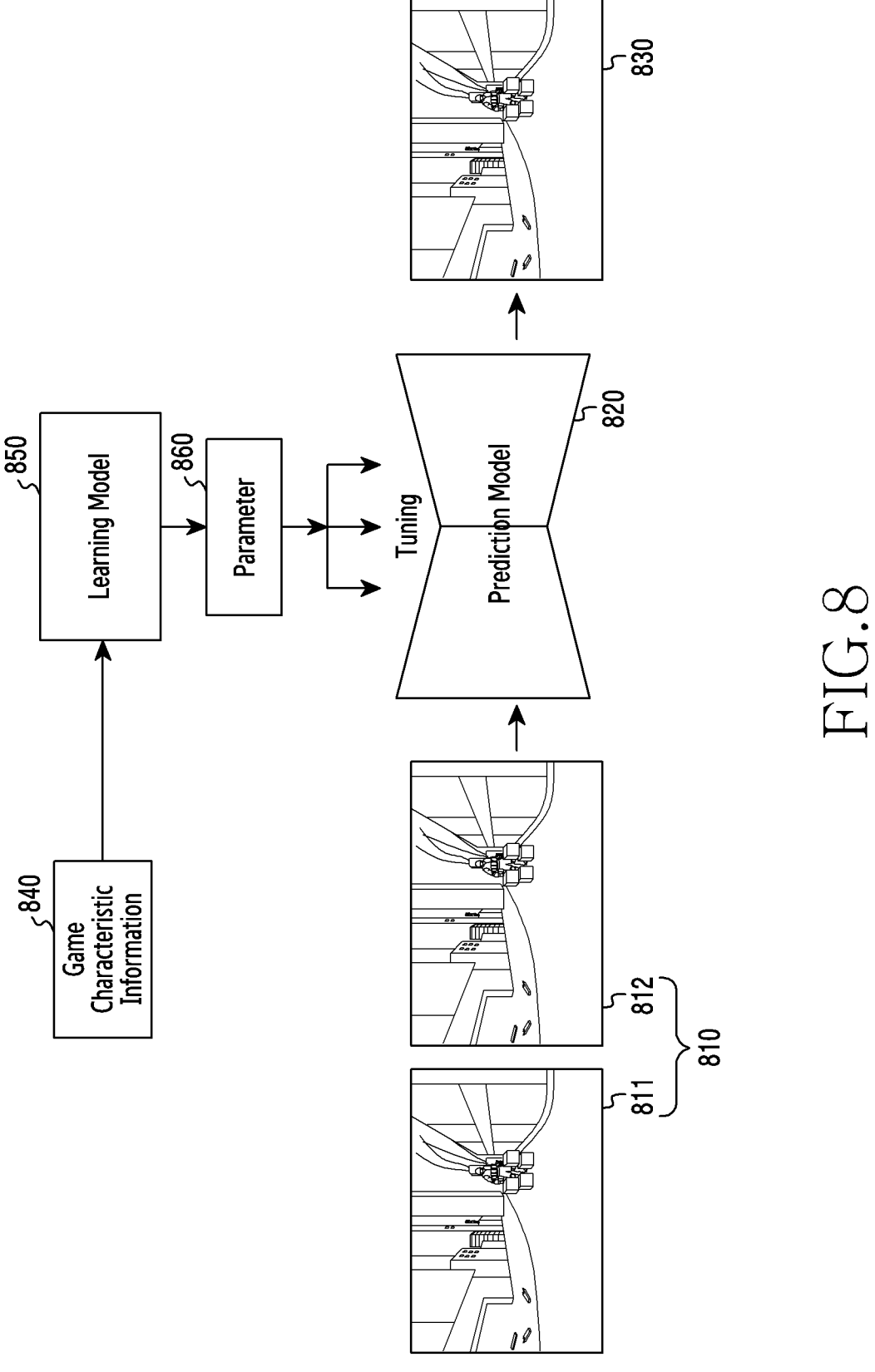
FIG. 8 is a block diagram illustrating a tuning method of a prediction model based on game characteristic information according to an embodiment.

FIG. 8 is a view illustrating a tuning method of a prediction model based on game characteristic information according to an embodiment.

In an embodiment and referring to FIG. 8, a processor (e.g., the processor 270 in FIG. 2) of an electronic device (e.g., the electronic device 200 in FIG. 2) may generate a prediction image frame 830 based on an artificial intelligence-based trained prediction model 820 (e.g., the prediction model 630 in FIG. 6 or the prediction model 720 in FIG. 7). In this case, an input value of the prediction model 820 may include at least one of at least one image frame 810 (the first image frame) received from an external electronic device (e.g., the electronic device 300 in FIG. 3) through a communication circuit (e.g., the communication circuit 250 in FIG. 2), and information for predicting an image frame (the second image frame) consecutive to the at least one image frame 810. FIG. 8 illustrates the case in which two image frames 811 and 812 are used as an input of the prediction model 820 but the disclosure is not limited thereto. According to an embodiment, one image frame, 811 or 812, may be used as an input of the prediction model 820.

According to an embodiment, in the case that the first image frame 810 configures a screen of a designated game, the processor may tune the prediction model 820 based on an artificial intelligence-based learning model (850) (e.g., an adjustment model) using characteristic information 840 of the designated game as an input value. In this case, the learning model 850 may learn a motion of an object according to characteristic information 840 (e.g., a game title, a game genre, and/or key images representing a game) of the designated game and/or characteristics of an image frame, and may output a parameter 860 to which a predicted motion of an object and/or a characteristic of an image frame are reflected according to the first image frame when the first image frame is input. In this case, the processor may tune the prediction model 820 by using the obtained parameter 860 and/or generate a prediction image frame 830 specified to the designated game through the prediction model 820.

Figure 9:
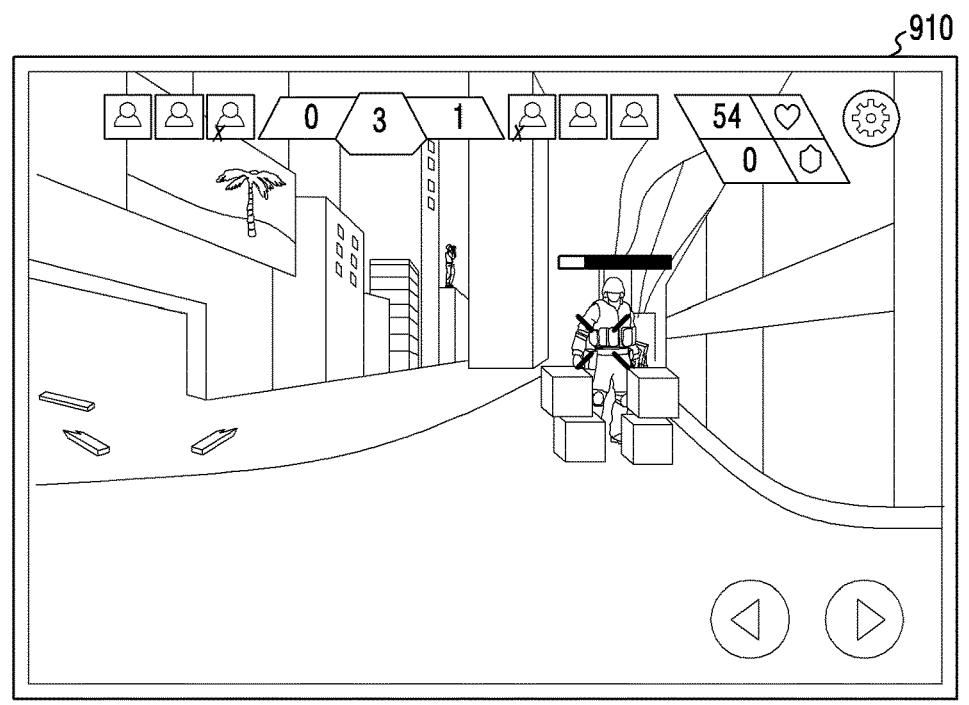
FIG. 9 is a visual diagram illustrating information for predicting an image frame according to an embodiment.
Figure 9:
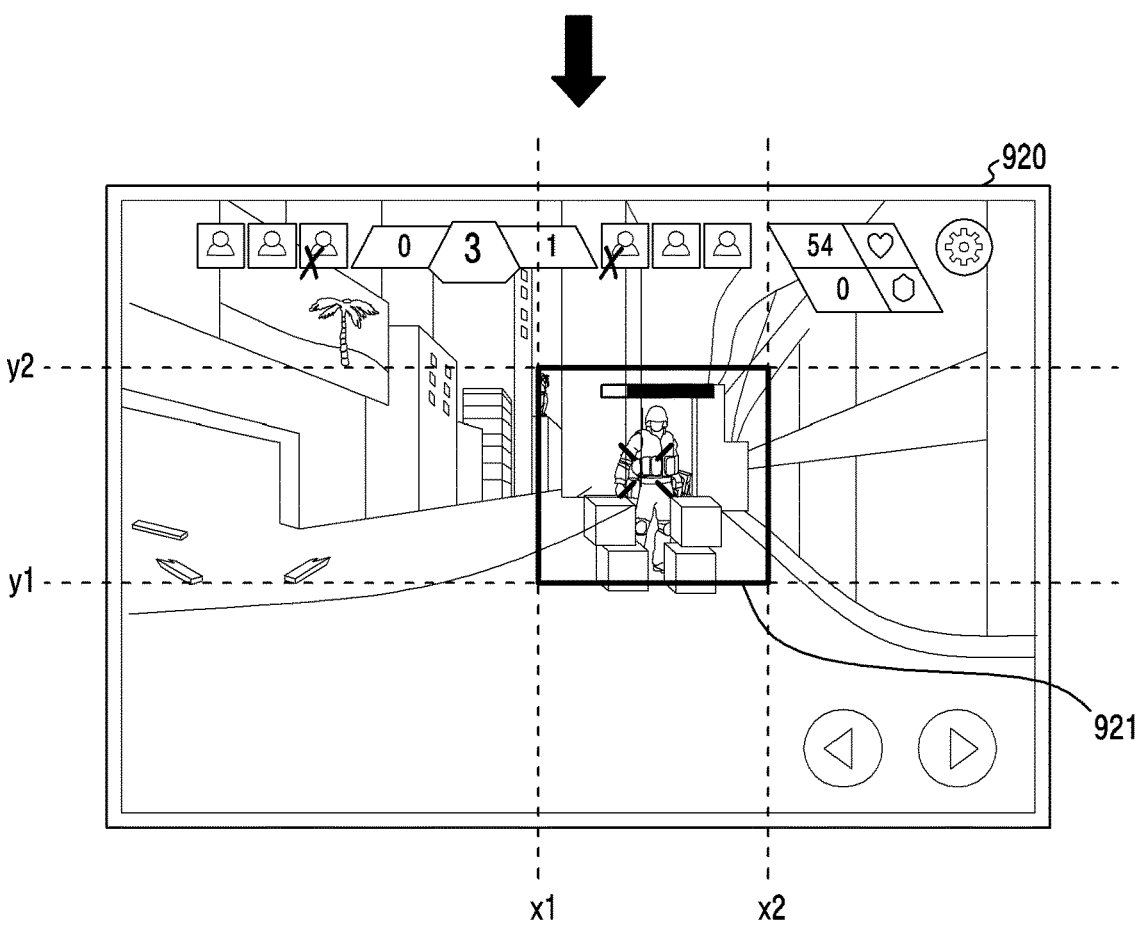

FIG. 9 is a visual display illustrating information for predicting an image frame according to an embodiment.

In an embodiment and referring to FIG. 9, a processor (e.g., the processor 270 in FIG. 2) of an electronic device (e.g., the electronic device 200 in FIG. 2) may receive a first image frame 910 and information for predicting a second image frame 920 consecutive to the first image frame 910 from an external electronic device (e.g., the electronic device 300 in FIG. 3) through a communication circuit (e.g., the communication circuit 250 in FIG. 2).

According to an embodiment, the information for predicting the second image frame 920 may include at least one of vector information on a motion of an object area included in the first image frame 910, vector information on a motion of points within the object area, information on key points detected in the first image frame 910, information on points of the second image frame 920 corresponding to the key points detected in the first image frame 910 (or, transformation matrix (rotation and translation information) for detecting corresponding points), key frame (e.g., an I-Frame) information corresponding to the second image frame 920, information on an area 921 to be changed in the second image frame 920, segmentation mask information used for distinguishing an object and/or a background in the first image frame 910 (and/or the second image frame 920), and/or optical flow information in a changed area between the first image frame 910 and the second image frame 920, but is not limited to the described methods. FIG. 9 illustrates a case in which information on the area 921 to be changed in the second image frame 920 is received as information for predicting the second image frame 920.

In an embodiment, the information on the area 921 to be changed in the second image frame 920 may include, for example, coordinate values (x1, y1, x2, and y2) for the area 921 to be changed in the second image frame 920 obtained by comparing with the first image frame 910. By way of example, in the case of a game, a background corresponding to a game map and an object (e.g., a character) movable on the game map may exist. In the case that a distance that the object is moved is not large, while the background may rarely change through consecutive image frames, the object may be moved based on a user input. Accordingly, an area including the object may be configured as the area 921 to be changed.

Figure 10:
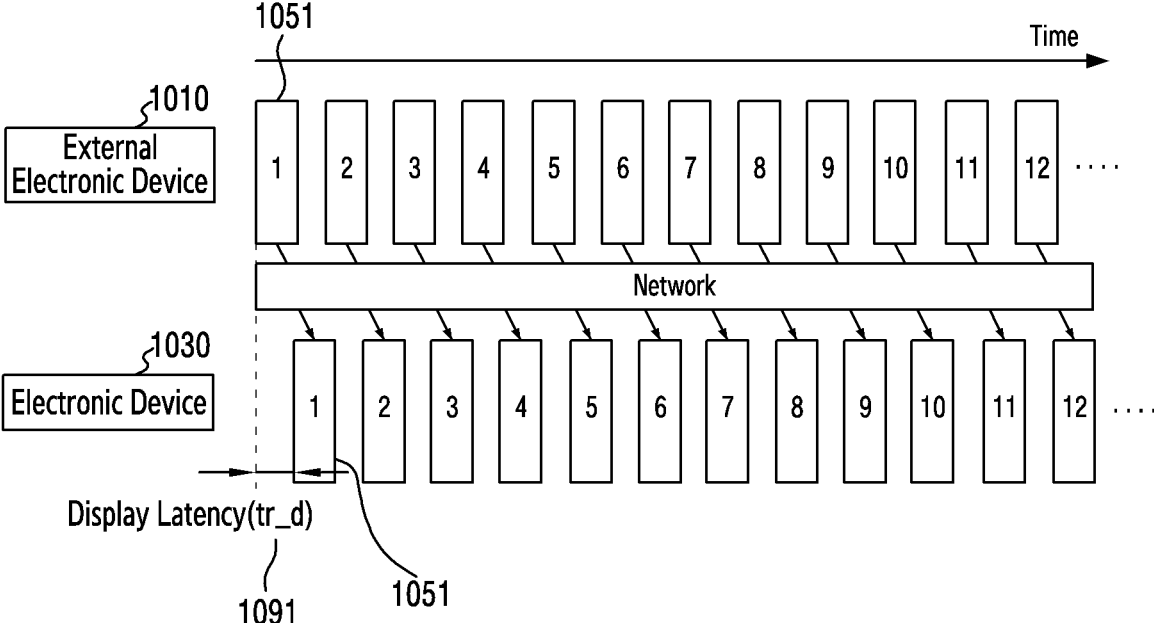
FIG. 10 is a block diagram illustrating display latency of an image frame according to an embodiment.

FIG. 10 is a block diagram illustrating display latency of an image frame according to an embodiment.

In an embodiment and referring to FIG. 10, an electronic device 1030 (e.g., the electronic device 200 in FIG. 2) may receive at least one image frame 1051 from an external electronic device 1010 (e.g., the electronic device 300 in FIG. 3) through a network. In case that the first image frame 1051 is rendered at a first time t1 in the external electronic device 1010 (e.g., a cloud game server) and the first image frame 1051 is displayed at a second time t2 on a display (e.g., the display 230 in FIG. 2) of the electronic device 1030, latency time (tr_d) 1091 may correspond to a difference value (t2−t1) between the first time and the second time. The latency time 1091 may be calculated from a total sum of rendering and encoding time of an image frame, a time required for transmitting an image, and a time required for decoding a received image frame and outputting the decoded image frame on the display.

Figure 11:
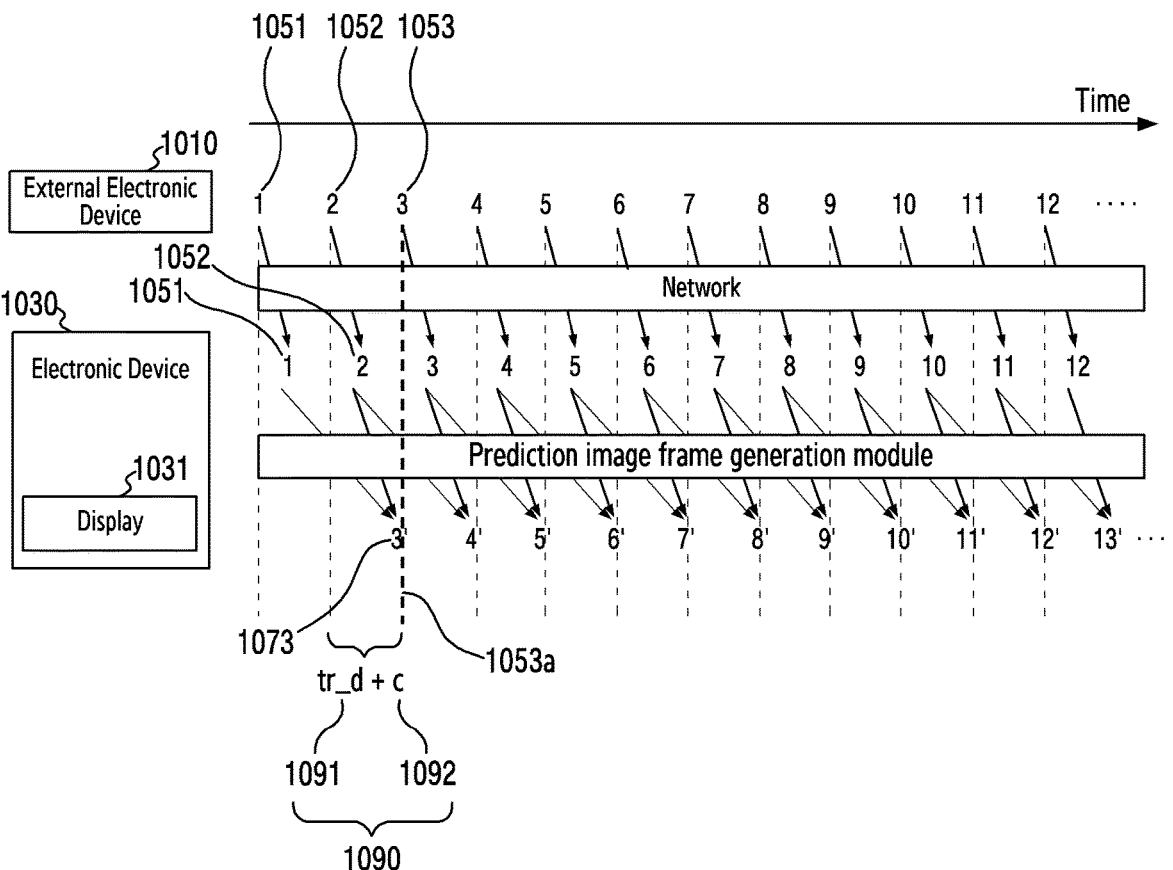
FIG. 11 is a block diagram illustrating a method for processing display latency of an image frame according to an embodiment.

FIG. 11 is a block diagram illustrating a method for processing display latency of an image frame according to an embodiment.

In an embodiment and referring to FIG. 11, an electronic device 1030 (e.g., the electronic device 200 in FIG. 2) may receive at least one image frame from an external electronic device 1010 (e.g., the electronic device 300 in FIG. 3) through a network. For example, the electronic device 1030 may receive a first image frame 1051 and a second image frame 1052 from the external electronic device 1010.

According to an embodiment, assuming that a reception time of the second image frame 1052 received from the external electronic device 1010 is a first time t1, and a generation time of the second image frame 1052 and a generation time of a third image frame 1053 included in meta information of the second image frame 1052 are a second time t2 and a third time t3 (1053a), respectively, in the case that a sum (tr_d+c) 1090 of a difference value (tr_d=t1−t2) 1091 between the first time and the second time, and a time value c 1092 required to generate a prediction image frame 1073 is smaller than or equal to a difference value (t3−t2) (e.g., one frame time interval) between the second time and the third time, the electronic device 1030 may generate and/or display a prediction image frame 1073 for a user not to recognize latency time (e.g., zero-latency). For example, the electronic device 1030 may display the generated prediction image frame 1073 at the generation time 1053a of the third image frame 1053 included in the meta information of the second image frame 1052 on a display 1030 (e.g., the display 230 in FIG. 2). Accordingly, by displaying the prediction image frame 1073 at the generation time 1053a of the third image frame 1053, the user may not recognize the latency time.

FIG. 11 illustrates a case in which the first image frame 1051 and the second image frame 1052 may not be displayed on the display 1030 so that among image frames generated by the external electronic device 1010, the remaining image frames excluding the first image frame 1051 and the second image frame 1052 are displayed on the display 1030 according to generation times. However, the disclosure is not limited thereto. According to an embodiment, the electronic device 1030 may display the first image frame 1051 and the second image frame 1052 on the display 1030.

Figure 12:
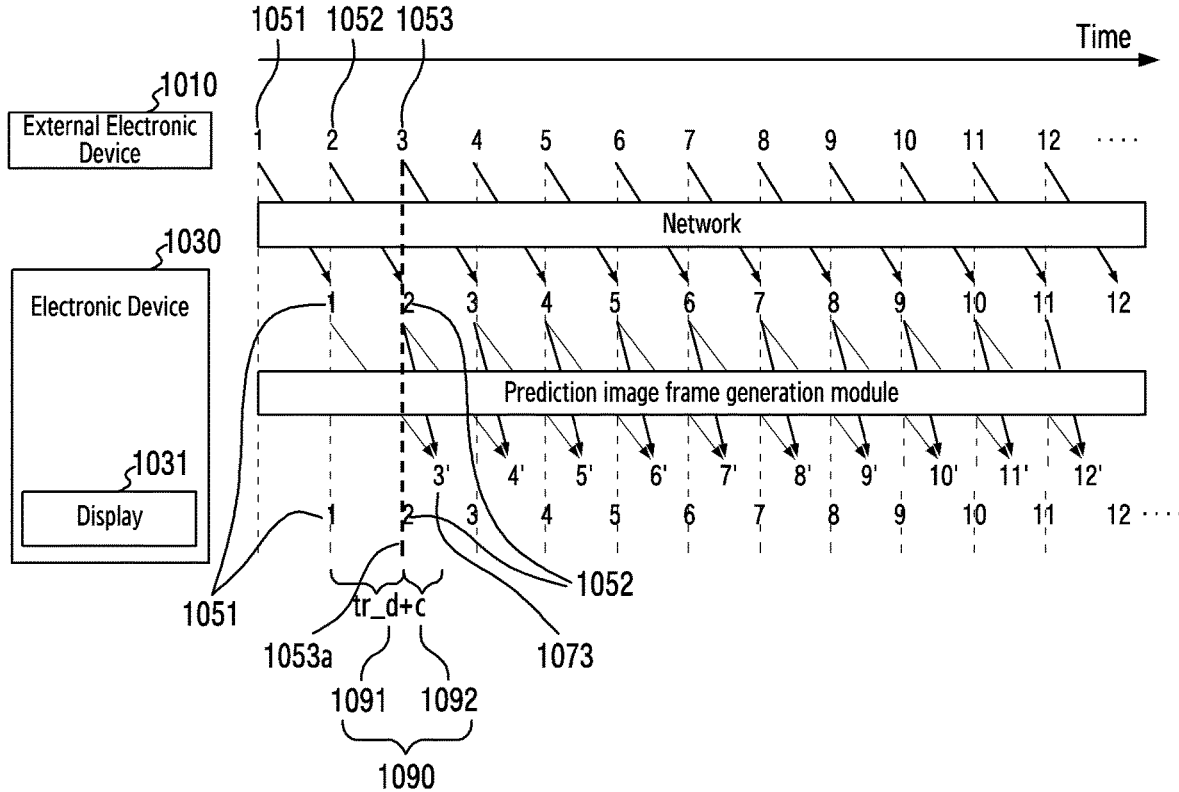
FIG. 12 is a block diagram illustrating another method for processing display latency of an image frame according to an embodiment.

FIG. 12 is a block diagram illustrating another method for processing display latency of an image frame according to an embodiment.

In an embodiment and referring to FIG. 12, an electronic device 1030 (e.g., the electronic device 200 in FIG. 2) may receive at least one image frame from an external electronic device 1010 (e.g., the electronic device 300 in FIG. 3) through a network. For example, the electronic device 1030 may receive a first image frame 1051 and a second image frame 1052 from the external electronic device 1010.

According to an embodiment, assuming that a reception time of the second image frame 1052 received from the external electronic device 1010 is a first time t1, and a generation time of the second image frame 1052 and a generation time of a third image frame 1053 included in meta information of the second image frame 1052 are a second time t2 and a third time t3 (1053a), respectively, in the case that a sum (tr_d+c) 1090 of a difference value (tr_d=t1−t2) 1091 between the first time and the second time, and a time value c 1092 required to generate a prediction image frame 1073 is greater than a difference value (t3−t2) (e.g., one frame time interval) between the second time and the third time, the electronic device 1030 may generate and/or display a prediction image frame 1073 so that a user recognizes the latency time to some extent but is given an effect of increasing the number of output frames per time (reduced latency). For example, the electronic device 1030 may display the first image frame 1051 and the second image frame 1052 on the display 1030 (e.g., the display 230 in FIG. 2) in accordance with each display time thereof and display the generated prediction image frame 1073 between the display time of the second image frame 1052 and the display time of the third image frame 1053 on the display 1030. Thereafter, in the case that the third image frame 1053 is received from the external electronic device 1010, the electronic device 1030 may display the third image frame 1053 on the display 1030. For example, in FIG. 12, since the prediction image frame 1073 is displayed between a predicted image frame (e.g., the third image frame 1053) and an image frame (e.g., the second image frame 1052) used for prediction, a user may recognize latency time to some extent but the number of frames per time increases so that the user may experience increased FPS compared to the FPS of original image frames.

Figure 13:
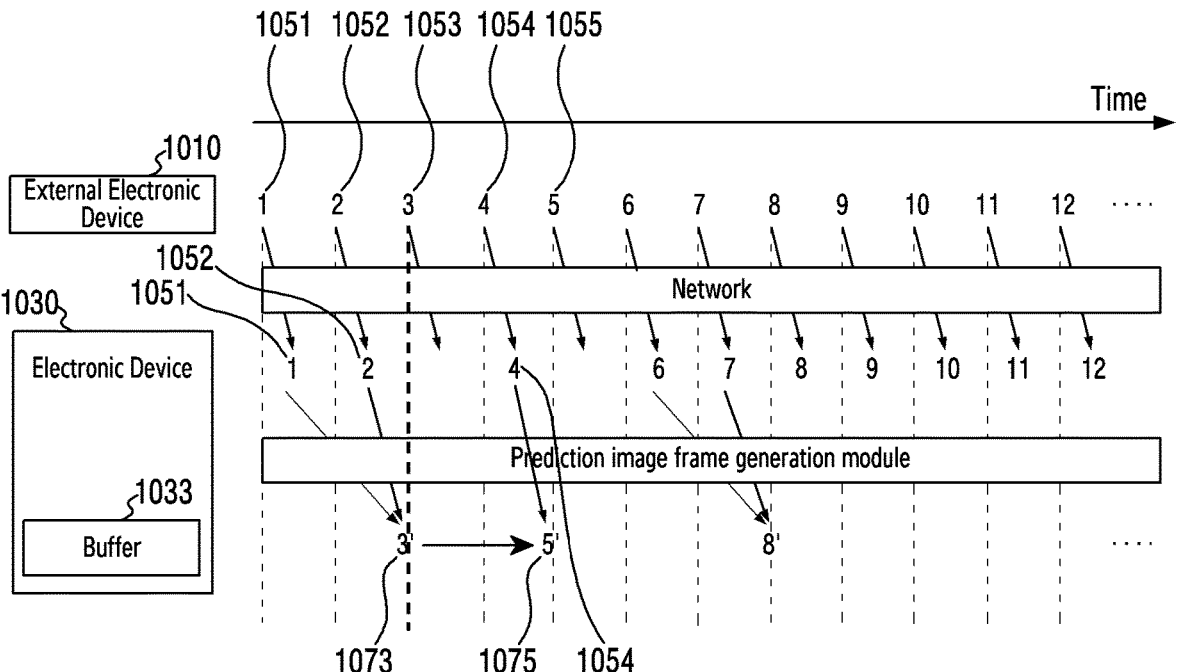
FIG. 13 is a block diagram illustrating a method for processing an image frame drop according to an embodiment.

FIG. 13 is a block diagram illustrating a method for processing an image frame drop according to an embodiment of the disclosure.

In an embodiment, referring to FIG. 13, an electronic device 1030 (e.g., the electronic device 200 in FIG. 2) may receive at least one image frame from an external electronic device 1010 (e.g., the electronic device 300 in FIG. 3) through a network. For example, the electronic device 1030 may receive a first image frame 1051 and a second image frame 1052 from the external electronic device 1010.

According to an embodiment, in the case of determining that the third image frame 1053 consecutive to the second image frame 1052 is dropped, the electronic device 1030 may generate and/or display a prediction image frame 1073 with respect to the third image frame 1053, which corresponds to a previous order of the third image frame 1053 in the display order, by using at least one image frame (e.g., the first image frame 1051 and/or the second image frame 1052) received from the external electronic device 1010.

According to an embodiment, when generating a prediction image frame with respect to a dropped image frame, the electronic device 1030 may use a pre-generated prediction image frame together with a pre-received image frame. For example, in the case that a fourth image frame 1054 is received but a fifth image frame 1055 is not received (is dropped) from the external electronic device 1010, the electronic device 1030 may generate and/or display a prediction image frame 1075 with respect to the fifth image frame 1055 by using the fourth image frame 1054 and the pre-generated prediction image frame 1073.

Figure 14:
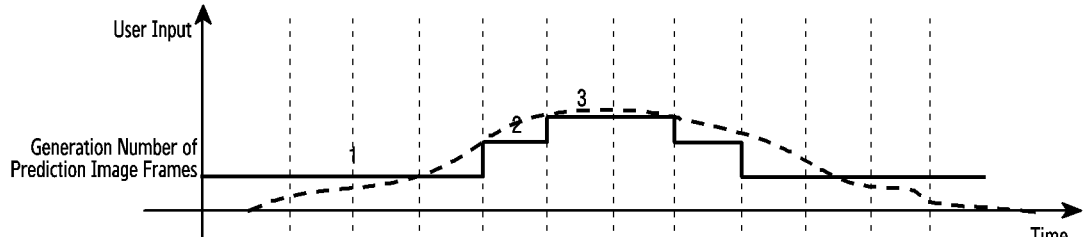

FIG. 14 is a graph illustrating a method for determining the number of generations of prediction image frames based on a user input according to an embodiment.

In an embodiment, referring to FIG. 14, an electronic device (e.g., the electronic device 200 in FIG. 2) may determine the number of prediction image frames to be generated based on at least one of latency time of an image frame (e.g., the second image frame) and/or a user input (including history information (e.g., information on n inputs input at previous time point)) received through an input device (e.g., the input device 210 in FIG. 2). By way of example, the generation number of prediction image frames may be configured to increase as the display latency time of the image frame increases. For another example, the generation number of prediction image frames may be configured to increase as the number of the received user inputs increases.

FIG. 14 illustrates the case in which the number of prediction images to be generated increases as the user inputs increase. According to an embodiment, the electronic device may configure the number of user inputs for each stage to configure the number of the prediction images for each increasing section.

Figure 15:
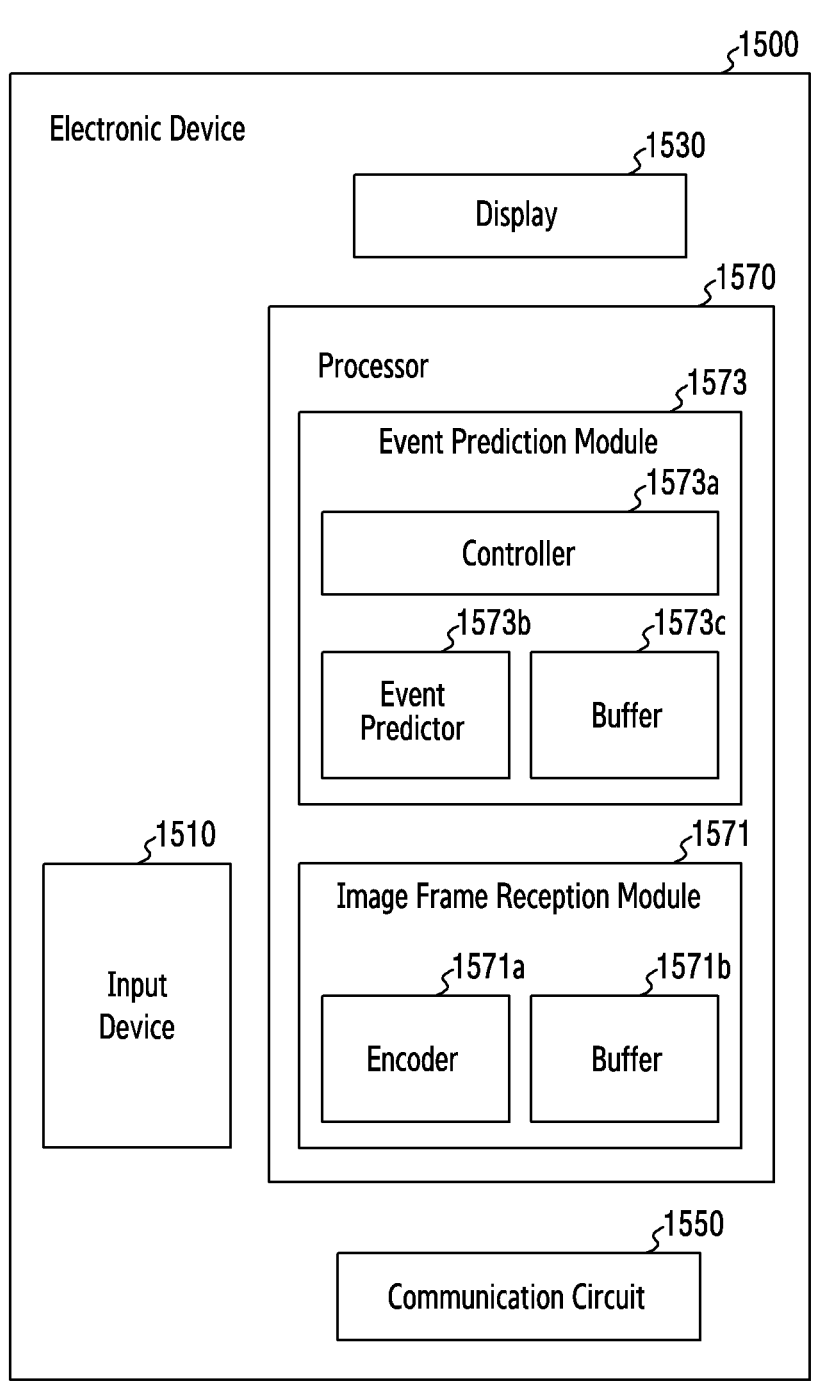
FIG. 15 is a block diagram illustrating another configuration of an electronic device related to image frame processing according to an embodiment.

FIG. 15 is a block diagram illustrating another configuration of an electronic device related to image frame processing according to an embodiment.

In an embodiment, an electronic device 1500 (e.g., the electronic device 101 in FIG. 1 or the electronic device 200 in FIG. 2) may display an image frame received from an external electronic device (e.g., the electronic device 300 in FIG. 3) connected thereto through a network. Furthermore, the electronic device 1500 may predict an input event based on the received user input in a state in which the received image frame is displayed, transmit information related to the predicted input event to the external electronic device, receive an image frame according to the predicted input event from the external electronic device, and display the image frame. For example, the electronic device 1500 may predict a user input and/or receive an image frame in advance based on predicted information so as to reduce display latency of the image frame.

In an embodiment and referring to FIG. 15, the electronic device 1500 for supporting the aforementioned function may include an input device 1510 (e.g., the input module 150 in FIG. 1 or the input device 210 in FIG. 2), a display 1530 (e.g., the display module 160 in FIG. 1 or the display 230 in FIG. 2), a communication circuit 1550 (e.g., the communication module 190 in FIG. 1 or the communication circuit 250 in FIG. 2), and a processor 1570 (e.g., the processor 120 in FIG. 1 or the processor 270 in FIG. 2). However, the configuration of the electronic device 1500 is not limited thereto. According to various embodiments, the electronic device 1500 may include at least one other component in addition to the above-described components. By way of example, the electronic device 1500 may further include a memory (e.g., the memory 130 in FIG. 1) for storing data processed through the processor 1570 and/or data received from an external electronic device through the communication circuit 1550.

The input device 1510 may receive a command and/or data to be used for a component (e.g., the processor 1570) of the electronic device 1500 from the outside (e.g., a user) of the electronic device 1500. The input device 1510 may include, for example, at least one of a microphone, a mouse, a keyboard, a key (e.g., a button), and/or a digital pen (e.g., a stylus pen). According to an embodiment, in the case that the electronic device 1500 corresponds to a HMD worn on the head of a user, the input device 1510 may include a sensor mounted to the HMD, and a user input received through the input device 1510 may include an input (e.g., an input obtained by moving the head of the user wearing the HMD) corresponding to a motion of the HMD measured by the sensor. According to another embodiment, the input device 1510 may include a sensor mounted to an auxiliary device (e.g., a (gaming) stick) linked with the electronic device 1500. In this case, the user input received through the input device 1510 may include an input (e.g., an input obtained from a user grabbing a gaming stick and shaking and/or moving the gaming stick) corresponding to a motion of the auxiliary device measured through the sensor.

The display 1530 may display various contents (e.g., a text, an image, a video, an icon, or a symbol, etc.) to a user. According to an embodiment, the display 1530 may display an image frame received from an external electronic device through the communication circuit 1550. According to another embodiment, the display 1530 may display a prediction image frame generated through the processor 1570.

The display 1530 may include a touch screen and/or receive, for example, a touch input using an electronic pen and/or a portion of the user's body, a gesture input, a proximity input, and/or a hovering input.

In an embodiment, the communication circuit 1550 may support communication between the electronic device 1500 and/or an external electronic device (e.g., the electronic device 300 in FIG. 3). For example, the electronic device 1500 may transmit and/or receive a command and/or data to and/or from the external electronic device through the communication circuit 1550. According to an embodiment, the display 1500 may receive at least one image frame from the external electronic device through the communication circuit 1550. According to an embodiment, the electronic device 1500 may transmit information related to the predicted input event to the external electronic device through the communication circuit 1550 and/or receive an image frame to which the predicted input event has been applied, from the external electronic device through the communication circuit 1550.

In an embodiment, the processor 1570 may control at least one other component of the electronic device 1500 and/or may perform various data processing or calculations. For example, the processor 1570 may execute instructions for controlling operations of the input device 1510, the display 1530, and/or the communication circuit 1550.

In an embodiment, the processor 1570 may include an image frame reception module 1571 and an event prediction module 1573. The image frame reception module 1571 may perform a function identical or similar to that of the image frame reception module 271 in FIG. 2. The image frame reception module 1571 is a component for receiving an image frame from an external electronic device through the communication circuit 1550, and the event prediction module 1573 is a component for predicting a user input. According to an embodiment, at least one of the image frame reception module 1571 and the event prediction module 1573 may be a hardware component and/or a software component.

The image frame reception module 1571 may receive at least one image frame from an external electronic device through the communication circuit 1550. According to an embodiment, the at least one image frame may configure a screen of a designated game. For example, the at least one image frame may represent game screens which change as the game progresses.

According to an embodiment, the image frame reception module 1571 may include a decoder 1571a for decoding the image frame received from the external electronic device and a buffer 1571b for storing the decoded image frame. According to an embodiment, although not illustrated in the drawing, the buffer 1571b may be included outside the processor 1570 (e.g., the memory 130 of FIG. 1). It an embodiment, the decoder 1571a may be an encoder/decoder.

According to an embodiment, the event prediction module 1573 may include a controller 1573a for controlling obtainment of a user input obtained through the input device 1510 and/or prediction of a consecutive user input based on the obtained user input, an event predictor 1573b for predicting the user input and/or generating an input event, and/or a buffer 1573c for storing the generated input event and/or a prediction image frame generated from the generated input event. According to an embodiment, although not illustrated in the drawing, the buffer 1573c may be included outside the processor 1570 (e.g., the memory 130 of FIG. 1). The controller 1573a may store information (e.g., an input event) related to the user input received from the input device 1510 in the buffer 1573c. In the description below, in order to distinguish an input event according to a user input (e.g., an actual user input) obtained through the input device 1510 and an input event predicted and generated by the event predictor 1573b, the input event predicted and generated by the event predictor 1573b will be referred to as a prediction input event.

The controller 1573a may control the event predictor 1573b to generate a prediction input event. According to an embodiment, the controller 1573a may determine whether to generate the prediction input event based on an artificial intelligence-based learning model (e.g., a confidence model). For example, the controller 1573a may determine a confidence level for prediction success probability of the event predictor 1573b through the confidence model. In this case, an input value of the confidence model may include information (including input history information (e.g., information on n inputs input at a previous time point)) on a user input received through the input device 1510 and/or the image frame (including history information (e.g., information on n image frames received at a previous time point) of a received image frame) received from the external electronic device through the image frame reception module 1571. For example, since a prediction confidence level may be lowered in the case that a user inputs information multiple times in a short period of time (e.g., in case that a key is pressed multiple times in a short period of time or a screen is touched multiple times in a short period of time), user input information changes rapidly (e.g., in case that an input coordinate value changes greatly or a width of a mouse drag is large), and/or an image change between received image frames is very large in a state in which the image frame is displayed, whether to generate the input event may be determined through the confidence model using the received user input information and/or the received image frame as input values. According to an embodiment, the controller 1573a may control the event predictor 1573b not to generate the prediction input event in the case that a confidence level value output through the confidence model is less than a designated value, and control the event predictor 1573b to generate the prediction input event in case that a confidence level value is greater than or equal to a designated value.

In an embodiment, the event predictor 1573b may generate a prediction input event with respect to a predicted user input. In addition, the event predictor 1573b may store the generated prediction input event in the buffer 1573c. According to an embodiment, the event predictor 1573b may generate the prediction input event based on the received image frame and/or a user input received through the input device 1510. According to another embodiment, the event predictor 1573b may predict an input event (e.g., a second prediction input event) consecutive to the prediction input event by receiving the prediction input event (e.g., a first prediction input event) as an input.

According to an embodiment, the event predictor 1573b may generate the prediction input event based on an artificial intelligence-based learning model (e.g., a generation model). In this case, an input value of the generation model may be the received image frame and/or a user input received through the input device 1510. For example, the event predictor 1573b may predict a consecutive user input and/or generate the prediction input event based on an image frame displayed on a screen and/or a user input previously input. The generation model may be referred to as a prediction model.

According to an embodiment, in the case that at least one image frame configures a screen of a designated game, the processor 1570 may tune the generation model based on an artificial intelligence-based learning model (e.g., an adjustment model) using characteristic information of the designated game as an input value. In this case, the adjustment model may learn a motion of an object according to characteristic information (e.g., a game title, a game genre, or key images representing a game) of the designated game and/or characteristics of an image frame, and in the case that the image frame and/or input information of the received user input are input, the adjustment model may output a parameter to which a predicted user input according thereto, a motion of an object, and/or a characteristic of an image frame are reflected according to the predicted user input. In this case, the processor 1570 may tune the generation model by using the obtained parameter to generate a prediction input event specified for the designated game through the generation model.

According to an embodiment, the processor 1570 may transmit information on the prediction input event generated through the event predictor 1573b and receive an image frame according to the prediction input event from the external electronic device. Accordingly, the processor 1570 may display the received image frame according to the prediction input event on the display 1530 before an actual user input occurs through the input device 1510, so as to reduce latency of an image frame.

According to an embodiment, in the case that a user input is obtained through the input device 1510 after the prediction input event is generated, the processor 1570 may compare and/or analyze an input event corresponding to the obtained user input and/or the prediction input event. Furthermore, the processor 1570 may apply a comparison and/or analysis result to the generation model to train the generation model. For example, the processor 1570 may continuously train the generation model by using an actual received user input (an input event corresponding to a user input obtained through the input device 1510) and/or a predicted user input.

According to an embodiment, the processor 1570 may evaluate a prediction image frame based on the prediction input event. The function of generating the prediction image frame may be identical or similar to the function of the generator 273b in FIG. 2). For example, the processor 1570 may generate the prediction image frame based on an artificial intelligence-based learning model (e.g., a generation model). Here, an input value of the generation model may be the received image frame and/or the prediction input event. For example, the processor 1570 may generate the prediction image frame by applying the prediction input event to the received image frame.

According to an embodiment, the processor 1570 may evaluate a quality of the generated prediction input event. For example, the processor 1570 may evaluate whether the prediction input event is generated to be identical or similar to an actual input event (corresponding to a user input) obtained through the input device 1510 by using a trained model discriminator having been trained to evaluate the generated prediction input event, and/or an evaluation result may be used as an indicator of quality evaluation. According to an embodiment, in case that the quality is lower than or equal to a designated value, the processor 1570 may delete the generated prediction input event so that the generated prediction input event is not used. For example, the processor 1570 may delete prediction input events having qualities smaller than or equal to a designated value among prediction input events stored in the buffer 1573c.

As described above, according to various embodiments, an electronic device (e.g., the electronic device 1500) may include an input device (e.g., the input device 1510), a display (e.g., the display 1530), a communication circuit (the communication circuit 1550), and a processor (e.g., the processor 1570) operatively connected to the input device, the display, and the communication circuit, wherein the processor is configured to receive a first image frame from an external electronic device through the communication circuit, display the received first image frame through the display, receive a first user input through the input device in a state in which the first image frame is displayed, predict a second user input based on the received first image frame and/or the received first user input, generate a prediction input event corresponding to the predicted second user input, transmit information on the prediction input event to the external electronic device through the communication circuit, receive a second image frame according to the prediction input event from the external electronic device through the communication circuit, and/or display the received second image frame through the display.

According to various embodiments, the processor may be configured to transmit input information of the received first user input to the external electronic device through the communication circuit, receive a third image frame according to the first user input from the external electronic device through the communication circuit, and/or display the received third image frame through the display before displaying the received second image frame.

According to various embodiments, in the case that a third user input consecutive to the first user input and corresponding to the predicted second user input is received through the input device, the processor may be configured to display the received second image frame through the display.

According to various embodiments, the processor may be configured to transmit input information of the received third user input to the external electronic device through the communication circuit, receive a third image frame according to the third user input from the external electronic device through the communication circuit, and/or display the received third image frame through the display after displaying the received second image frame.

According to various embodiments, the processor may be configured to generate the prediction input event based on an artificial intelligence-based first learning model by using the received first image frame and/or the received first user input.

According to various embodiments, in the case that a third user input consecutive to the first user input and corresponding to the predicted second user input is received through the input device, the processor may be configured to compare and/or analyze the prediction input event and/or an input event corresponding to the received third user input and apply a result of the comparison and analysis to the first learning model.

According to various embodiments, the processor may be configured to, in the case that the first image frame configures a screen of a designated game, obtain a parameter to which a motion of a predicted object and/or a characteristic of an image frame according to an input of the first image frame and/or information related to the first user input are applied, through an artificial intelligence-based second learning model having learned a motion of an object according to user input and/or a characteristic of an image frame based on characteristic information of the designated game, and tune the first learning model by using the obtained parameter.

According to various embodiments, the processor may be configured to determine whether to generate the prediction input event through an artificial intelligence-based learning model using input information on the first user input as an input value.

As described above, according to various embodiments, an electronic device (e.g., the electronic device 1500) may include an input device (e.g., the input device 1510), a display (e.g., the display 1530), a communication circuit (the communication circuit 1550), and/or a processor (e.g., the processor 1570) operatively connected to the input device, the display, and the communication circuit, wherein the processor is configured to receive a first image frame from an external electronic device through the communication circuit, display the received first image frame through the display, receive a first user input through the input device in a state in which the first image frame is displayed, predict a second user input based on the received first image frame and/or the received first user input, generate a prediction input event corresponding to the predicted second user input, generate a prediction image frame based on the generated prediction input event, and/or display the prediction image frame through the display.

According to various embodiments, the processor may be configured to transmit input information of the received first user input to the external electronic device through the communication circuit, receive a second image frame according to the first user input from the external electronic device through the communication circuit, and/or display the received second image frame through the display before displaying the prediction image frame.

According to various embodiments, in the case that a third user input consecutive to the first user input and corresponding to the predicted second user input is received through the input device, the processor may be configured to display the prediction image frame through the display.

According to various embodiments, the processor may be configured to transmit input information of the received third user input to the external electronic device through the communication circuit, receive a second image frame according to the third user input from the external electronic device through the communication circuit, and/or display the received second image frame through the display after displaying the prediction image frame.

Figure 16:
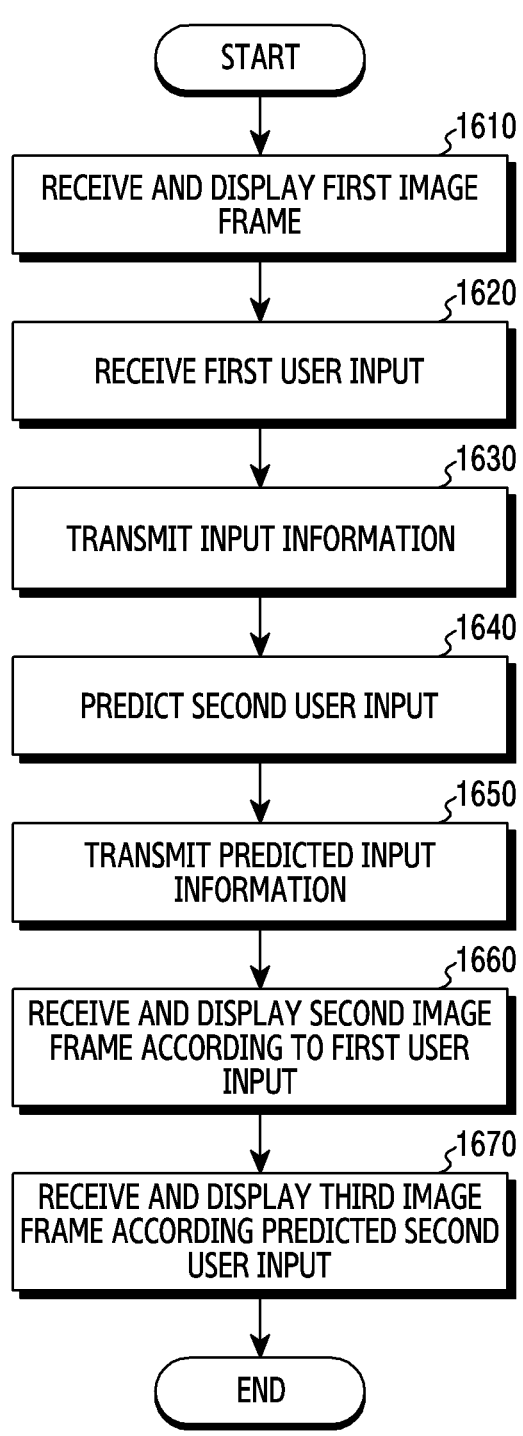
FIG. 16 is a block diagram illustrating an operation method of an electronic device for processing image frame display latency through input event prediction according to an embodiment.

FIG. 16 is a block diagram illustrating a method of an electronic device for processing image frame display latency through input event prediction according to an embodiment.

In an embodiment and referring to FIG. 16, a processor (e.g., the processor 1570 in FIG. 15) of an electronic device (e.g., the electronic device 1500 in FIG. 15) may receive a first image frame from an external electronic device (e.g., the electronic device 300 in FIG. 3) through a communication circuit (e.g., the communication circuit 1550 in FIG. 15) and display the received first image frame on a display (e.g., the display 1530 in FIG. 15), as shown in operation block 1610. According to an embodiment, the processor may display the received first image frame on the display to correspond to a display time of the received first image frame.

In an embodiment, the processor may receive a first user input through an input device (e.g., the input device 1510 in FIG. 15) in a state in which the first image frame is displayed, as shown in operation block 1620. According to an embodiment, the input device may include a microphone, a mouse, a keyboard, a key (e.g., a button), and/or a digital pen (e.g., a stylus pen). According to another embodiment, in the case that the electronic device corresponds to a HMD worn on the head of a user, the input may include a sensor mounted to the HMD, and/or a user input received through the input device may include an input (e.g., an input obtained by moving the head of the user wearing the HMD) corresponding to a motion of the HMD measured by the sensor. According to still another embodiment, the input device may include a sensor mounted to an auxiliary device (e.g., a (gaming) stick) linked to the electronic device, and/or the user input received through the input device may include an input (e.g., an input obtained from a user grabbing a gaming stick and shaking and/or moving the gaming stick) corresponding to a motion of the auxiliary device measured through the sensor.

In an embodiment, the processor may transmit input information of the received first user input to the external electronic device through the communication circuit, as shown in operation block 1630.

In an embodiment, the processor may predict a second user input (or input event), as shown in operation block 1640. According to an embodiment, the processor may generate a prediction input event with respect to the predicted second user input based on the input information of the received first user input. According to another embodiment, the processor may generate a prediction input event with respect to the predicted second user input based on the first image frame and/or the input information of the received first user input.

According to an embodiment, the processor may generate a prediction input event with respect to the predicted second user input based on an artificial intelligence-based learning model (e.g., a generation model). In this case, an input value of the generation model may be the first image frame and/or input information of the received first user input. For example, the processor may predict a consecutive user input (e.g., the second user input) and/or generate the prediction input event based on the first image frame disposed on a screen and/or input information of the first user input which is input in a state in which the first image frame is displayed. According to an embodiment, the received first user input (including input history information (e.g., information on n inputs input at a previous time point)) and/or the received first image frame (including history information (e.g., information on n image frames received at a previous time point) of a received image frame) may be used as an input value of the generation model.

In an embodiment, the processor may transmit input information of the predicted second user input to the external electronic device through the communication circuit, as shown in operation block 1650. For example, the processor may transmit information on the prediction input event with respect to the predicted second user input to the external electronic device.

In an embodiment, the processor may receive a second image frame according to the first user input from the external electronic device through the communication circuit and display the received second image frame on the display, as shown in operation block 1660. In this case, the second image frame may be an image frame to which input information of the received first user input transmitted to the external electronic device in operation 1630 is reflected.

In an embodiment, the processor may receive a third image frame according to the predicted second user input from the external electronic device through the communication circuit and display the received third image frame on the display, as shown in operation block 1670. In this case, the third image frame may be an image frame to which information on the prediction input event with respect to the predicted second user input transmitted to the external electronic device in operation 1650 is reflected. For example, the processor may transmit the prediction input event generated by predicting a second user input before actually obtaining the second user input through the input device after displaying an image frame (second image frame) to which the first user input obtained through the input device has been reflected and receive an image frame (third image frame) to which the prediction input event has been reflected from the external electronic device and display the image frame, so as to reduce latency due to a time taken from the input and obtainment of the actual second user input to the reception of the image frame to which the actual second user input is reflected.

According to an embodiment, the processor may receive the second user input through the input device. For example, the processor may receive the second user input through a microphone, a mouse, a key board, a key (e.g., a button), and/or a digital pen (e.g., a stylus pen), receive the second user input (e.g., an input obtained by moving the head of the user wearing the HMD) corresponding to a motion of the HMD through a sensor mounted to the HMD, and/or receive the second user input (e.g., an input obtained from a user grabbing a gaming stick and shaking and/or moving the gaming stick) corresponding to a motion of an auxiliary device through a sensor mounted to the auxiliary device (e.g., a (gaming) stick) linked to the electronic device. Furthermore, the processor may transmit input information of the received second user input to the external electronic device through the communication circuit. Thereafter, the processor may receive a fourth image frame according to the second user input from the external electronic device through the communication circuit and display the received fourth image frame on the display. In this case, the fourth image frame may be an image frame to which input information of the received second user input transmitted to the external electronic device is reflected. The operation of receiving the second user input and transmitting input information of the received second user input to the external electronic device may be performed between operation 1660 and operation 1670. Alternatively, the operation of receiving the second user input and transmitting input information of the received second user input to the external electronic device may be performed after operation 1670 is performed.

According to an embodiment, the second user input received through the input device may be used during the learning process for generating the prediction input event. For example, the second user input may be used as an input value of an artificial intelligence-based learning model (e.g., a generation model).

According to various embodiments, at least one of operation 1610 to operation 1670 may be performed to overlap another operation at least partially in time or may be performed in an order different from the described order. By way of example, operation 1640 and operation 1650 may be performed after operation 1660 is performed. By way of another example, operation 1650 may be performed after operation 1660 is performed. By way of still another example, operation 1640 may be performed before operation 1630 is performed.

Figure 17:
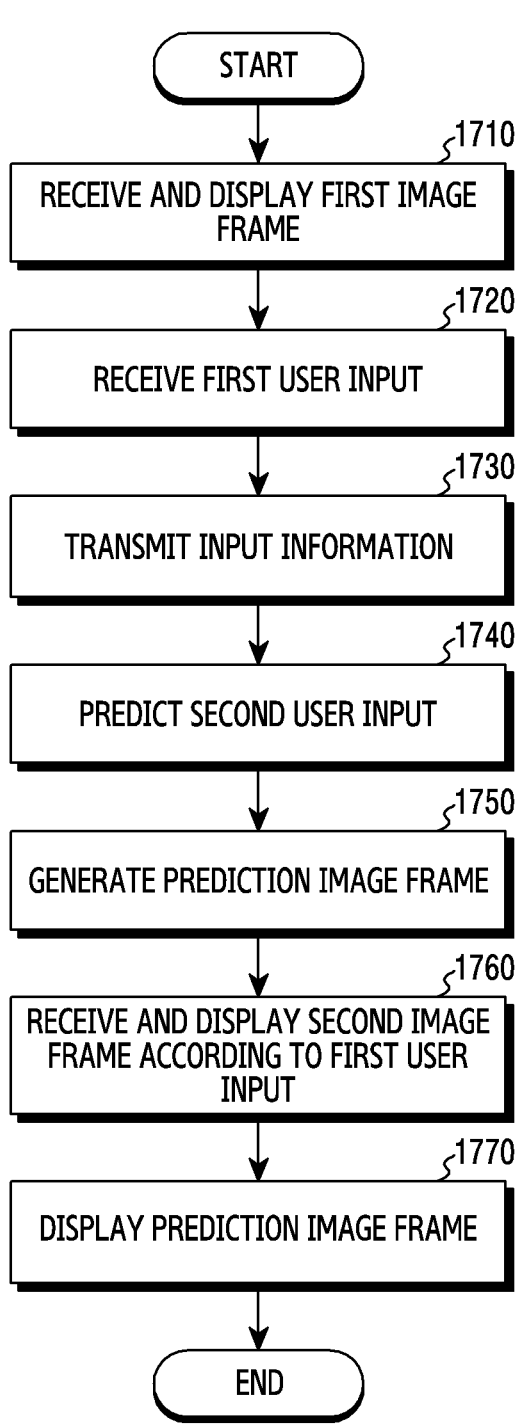
FIG. 17 is a block diagram illustrating another operation method of an electronic device for processing image frame display latency through input event prediction according to an embodiment.

FIG. 17 is a block diagram illustrating another operation method of an electronic device for processing image frame display latency through input event prediction according to an embodiment of the disclosure.

In an embodiment and referring to FIG. 17, a processor (e.g., the processor 1570 in FIG. 15) of an electronic device (e.g., the electronic device 1500 in FIG. 15) may receive a first image frame from an external electronic device (e.g., the electronic device 300 in FIG. 3) through a communication circuit (e.g., the communication circuit 1550 in FIG. 15) and display the received first image frame on a display (e.g., the display 1530 in FIG. 15), as shown in operation block 1710. According to an embodiment, the processor may display the received first image frame on the display to correspond to a display time of the received first image frame.

In an embodiment, the processor may receive a first user input through an input device (e.g., the input device 1510 in FIG. 15) in a state in which the first image frame is displayed, as shown in operation block 1720. According to an embodiment, the input device may include a microphone, a mouse, a keyboard, a key (e.g., a button), and/or a digital pen (e.g., a stylus pen). According to another embodiment, in the case that the electronic device corresponds to a HMD worn on the head to be used, the input may include a sensor mounted to the HMD, and a user input received through the input device may include an input (e.g., an input obtained by moving the head of the user wearing the HMD) corresponding to a motion of the HMD measured by the sensor. According to still another embodiment, the input device may include a sensor mounted to an auxiliary device (e.g., a (gaming) stick) linked to the electronic device, and/or the user input received through the input device may include an input (e.g., an input obtained from a user grabbing a gaming stick and shaking and/or moving the gaming stick) corresponding to a motion of the auxiliary device measured through the sensor.

In an embodiment, the processor may transmit input information of the received first user input to the external electronic device through the communication circuit, as shown in operation block 1730.

In an embodiment, the processor may predict a second user input (or input event), as shown in operation block 1740. According to an embodiment, the processor may generate a prediction input event with respect to the predicted second user input based on the input information of the received first user input. According to another embodiment, the processor may generate a prediction input event with respect to the predicted second user input based on the first image frame and/or the input information of the received first user input.

According to an embodiment, the processor may generate a prediction input event with respect to the predicted second user input based on an artificial intelligence-based learning model (e.g., a generation model). In this case, an input value of the generation model may be the first image frame and/or input information of the received first user input. For example, the processor may predict a consecutive user input (e.g., the second user input) and generate the prediction input event based on the first image frame disposed on a screen and/or input information of the first user input which is input in a state in which the first image frame is displayed. According to an embodiment, the received first user input (including input history information (e.g., information on n inputs input at a previous time point)) and the received first image frame (including history information (e.g., information on n image frames received at a previous time point) of a received image frame) may be used as an input value of the generation model.

In an embodiment, the processor may generate a prediction image frame based on the prediction input event with respect to the predicted second user input, as shown in operation block 1750. According to an embodiment, the processor may generate the prediction image frame based on an artificial intelligence-based learning model (e.g., a generation model). In this case, an input value of the generation model may be the first image frame and/or the prediction input event. For example, the processor may generate the prediction image frame by applying the prediction input event to the first image frame.

In an embodiment, the processor may receive a second image frame according to the first user input from the external electronic device through the communication circuit and display the received second image frame on the display, as shown in operation block 1760. In this case, the second image frame may be an image frame to which input information of the received first user input transmitted to the external electronic device in operation 1730 is reflected.

In in an embodiment, the processor may display the generated prediction image frame on the display, as shown in operation block 1770. For example, the processor may display the generated prediction image frame on the display to correspond to a display time of the generated prediction image frame. In this case, the display time of the generated prediction image frame may correspond to a time at which the second image frame to which the prediction input event is reflected from the external electronic device when information on the prediction input event is transmitted to the external electronic device. For example, the processor may not transmit the prediction input event to the external electronic device and display the prediction image frame generated based on the prediction input event on the display so as to reduce latency time of an image frame. Furthermore, the processor may generate the prediction image frame by predicting the second user input before actually obtaining the second user input through the input device after displaying an image frame (second image frame) to which the first user input obtained through the input device has been reflected and/or display the generated prediction image frame on the display when the second user input is actually obtained through the input device, so as to reduce latency due to a time taken from the transmission of the actual second user input to the reception of the image frame (e.g., the third image frame) to which the actual second user input is reflected.

According to an embodiment, the processor may receive the second user input through the input device. For example, the processor may receive the second user input through a microphone, a mouse, a key board, a key (e.g., a button), and/or a digital pen (e.g., a stylus pen), receive the second user input (e.g., an input obtained by moving the head of the user wearing the HMD) corresponding to a motion of the HMD through a sensor mounted to the HMD, and/or receive the second user input (e.g., an input obtained from a user grabbing a gaming stick and shaking and/or moving the gaming stick) corresponding to a motion of an auxiliary device through a sensor mounted to the auxiliary device (e.g., a (gaming) stick) linked to the electronic device. Furthermore, the processor may transmit input information of the received second user input to the external electronic device through the communication circuit. Thereafter, the processor may receive a third image frame according to the second user input from the external electronic device through the communication circuit and/or display the received third image frame on the display. Here, the third image frame may be an image frame to which input information of the received second user input transmitted to the external electronic device is reflected. The operation of receiving the second user input and/or transmitting input information of the received second user input to the external electronic device may be performed between operation 1760 and operation 1770. Alternatively, the operation of receiving the second user input and transmitting input information of the received second user input to the external electronic device may be performed between operation 1750 and operation 1760.

According to an embodiment, the second user input received through the input device may be used during the learning process for generating the prediction input event. For example, the second user input may be used as an input value of an artificial intelligence-based learning model (e.g., a generation model).

According to various embodiments, at least one of operation 1710 to operation 1770 may be performed to overlap another operation at least partially in time or may be performed in an order different from the described order. By way of example, operation 1740 and operation 1750 may be performed after operation 1760 is performed. By way of another example, operation 1750 may be performed after operation 1760 is performed. By way of still another example, operation 1740 may be performed before operation 1730 is performed.

According to an embodiment, the processor may evaluate a quality of the generated prediction input event. For example, the processor may evaluate whether the prediction input event is generated to be identical or similar to an actual input event (corresponding to a user input) obtained through the input device by using a trained model discriminator having trained to evaluate the generated prediction input event, and/or an evaluation result may be used as an indicator of quality evaluation. According to an embodiment, in the case that the quality is lower than or equal to a designated value, the processor may delete the generated prediction input event so that the generated prediction input event is not used. For example, the processor may delete prediction input events having qualities smaller than or equal to a designated value among prediction input events stored in a buffer (e.g., the buffer 1573c).

According to an embodiment, the processor may determine the number of prediction input events to be generated based on a user input (including input history information (e.g., information on n inputs input at a previous time point)) received through the input device. For example, the generation number of the prediction input event may be configured to increase as the number of the user inputs received through the input device increases. According to an embodiment, the processor may configure the number of the user inputs for each stage to configure the number of the prediction input events for each increasing section.

As described above, according to various embodiments, an image frame processing method of an electronic device (e.g., the electronic device 1500) may include an operation (e.g., operation 1610) of receiving a first image frame from an external electronic device through a communication circuit (e.g., the communication circuit 1550) of the electronic device, an operation (e.g., operation 1610) of displaying the received first image frame through a display (e.g., the display 1530) of the electronic device, an operation (e.g., operation 1620) of receiving a first user input through an input device (e.g., the input device 1510) of the electronic device in a state in which the first image frame is displayed, an operation (e.g., operation 1640) of predicting a second user input based on the received first image frame and the received first user input, an operation (e.g., operation 1640) of generating a prediction input event corresponding to the predicted second user input, an operation (e.g., operation 1650) of transmitting information on the prediction input event to the external electronic device through the communication circuit, an operation (e.g., operation 1670) of receiving a second image frame according to the prediction input event from the external electronic device through the communication circuit, and/or an operation (e.g., operation 1670) of displaying the received second image frame through the display.

According to various embodiments, the image frame processing method may further include an operation (e.g., operation 1630) of transmitting input information of the received first user input to the external electronic device through the communication circuit, an operation (e.g., operation 1660) of receiving a third image frame according to the first user input from the external electronic device through the communication circuit, and/or an operation (e.g., operation 1660) of displaying the received third image frame through the display before displaying the received second image frame.

According to various embodiments, in the case that a third user input consecutive to the first user input and corresponding to the predicted second user input is received through the input device, the operation of displaying the received second image frame may include an operation of displaying the received second image frame through the display.

According to various embodiments, the image frame processing method may further include an operation of transmitting input information of the received third user input to the external electronic device through the communication circuit, an operation of receiving a third image frame according to the third user input from the external electronic device through the communication circuit, and/or an operation of displaying the received third image frame through the display after displaying the received second image frame.

According to various embodiments, the operation of generating the prediction input event may include an operation of generating the prediction input event based on an artificial intelligence-based first learning model by using the received first image frame and/or the received first user input.

According to various embodiments, the image frame processing method may further include, in the case that a third user input consecutive to the first user input and corresponding to the predicted second user input is received through the input device, an operation of comparing and/or analyzing the prediction input event and/or an input event corresponding to the received third user input and/or an operation of applying a result of the comparison and/or analysis to the first learning model.

According to various embodiments, the image frame processing method may further include, in the case that the first image frame configures a screen of a designated game, an operation of obtaining a parameter to which a motion of a predicted object and/or a characteristic of an image frame according to an input of the first image frame and/or information on the first user input are applied, through an artificial intelligence-based second learning model having learned a motion of an object according to user input and/or a characteristic of an image frame based on characteristic information of the designated game, and/or an operation of tuning the first learning model by using the obtained parameter.

According to various embodiments, the image frame processing method may further include an operation of determining whether to generate the prediction input event through an artificial intelligence-based learning model using input information on the first user input as an input value.

Figure 18:
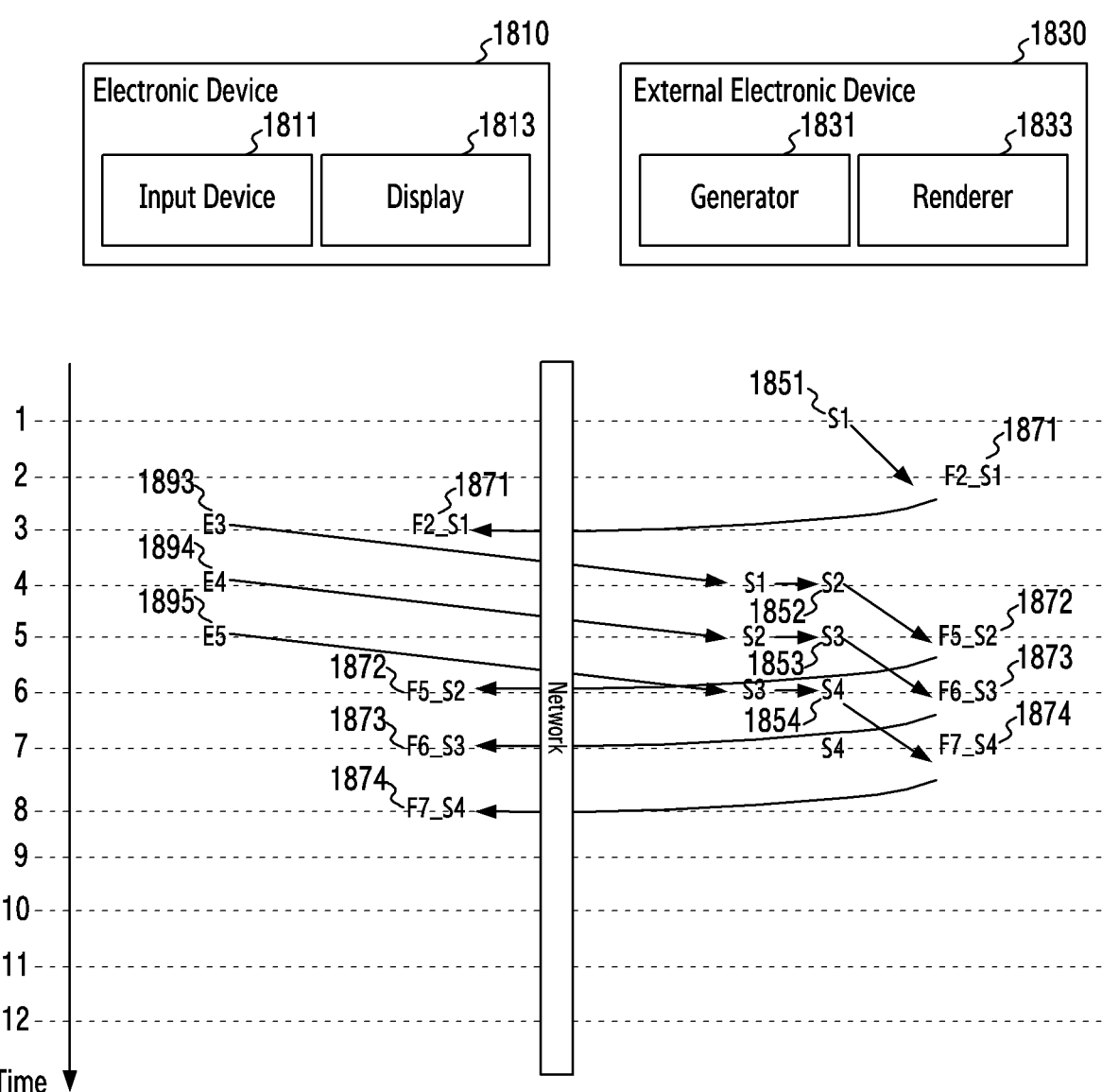
FIG. 18 is a block diagram illustrating display latency of an image frame related to an input event according to an embodiment.
Figure 19:
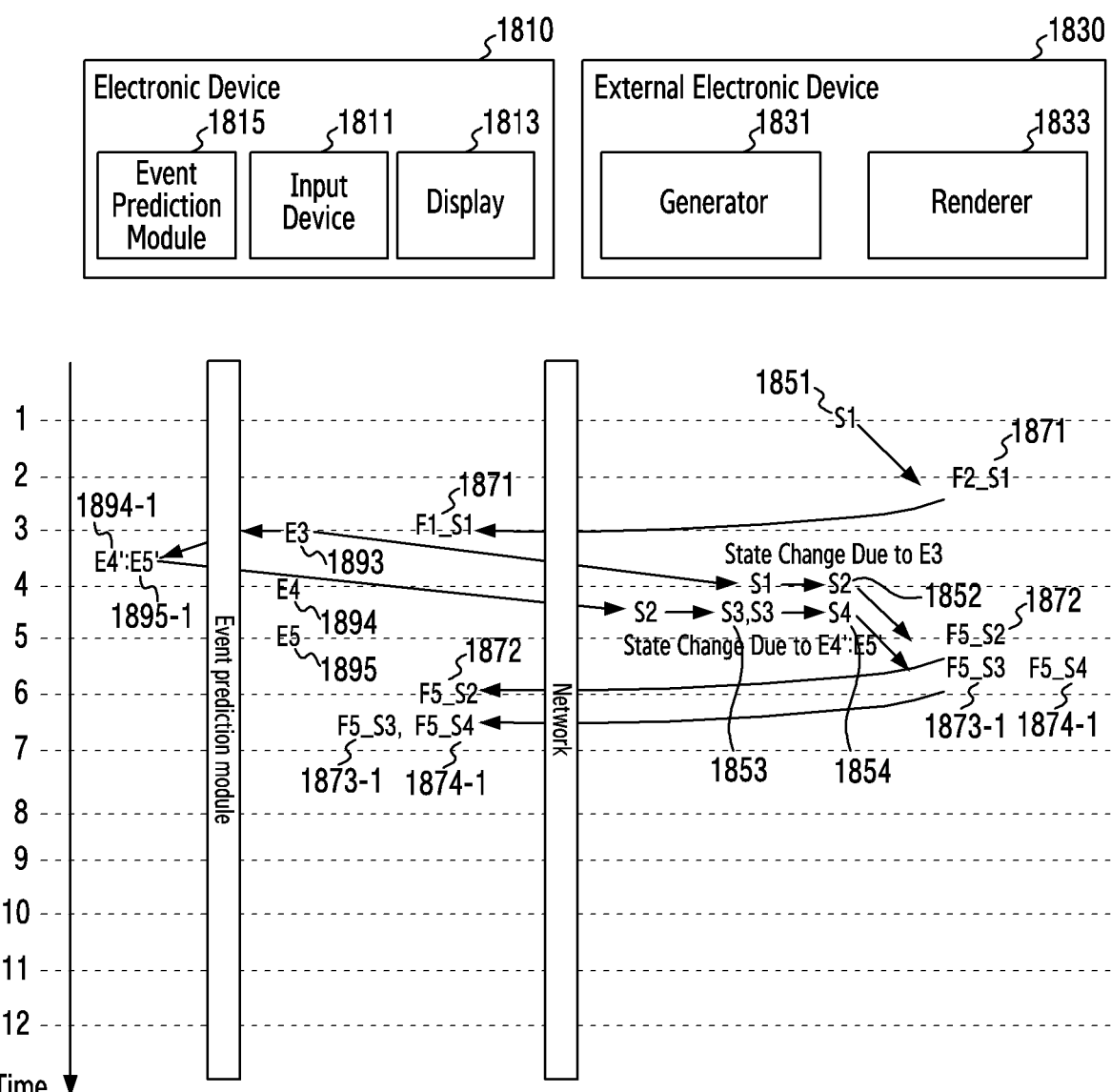
FIG. 19 is a block diagram illustrating a method for processing image frame display latency through input event prediction according to an embodiment.
Figure 20:
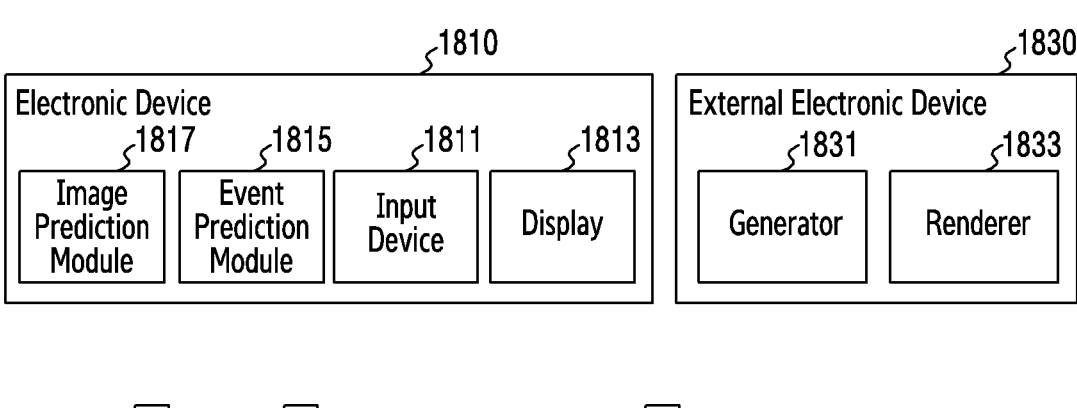
FIG. 20 is a block diagram illustrating another method for processing image frame display latency through input event prediction according to an embodiment.
Figure 20:
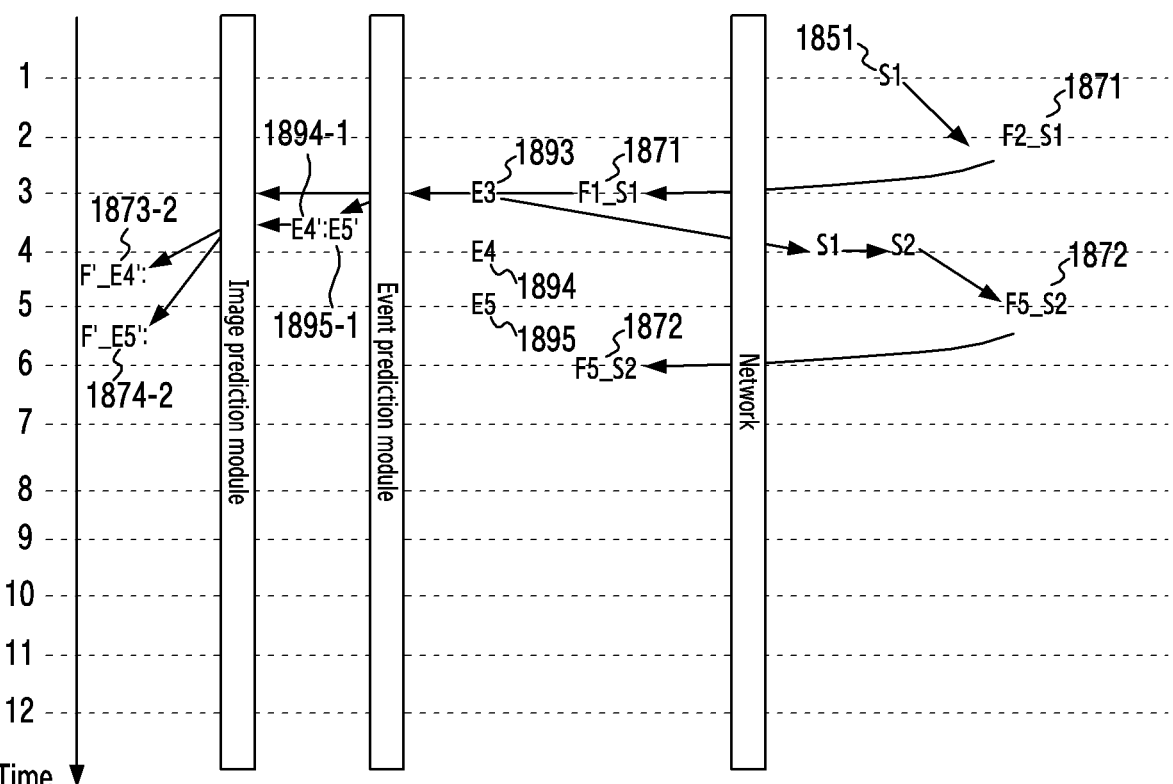

FIG. 18 is a view illustrating display latency of an image frame related to an input event according to an embodiment, FIG. 19 is a view illustrating a method for processing image frame display latency through input event prediction according to an embodiment, and FIG. 20 is a view illustrating another method for processing image frame display latency through input event prediction according to an embodiment.

In an embodiment and referring to FIG. 18, an electronic device 1810 (e.g., the electronic device 1500 in FIG. 15) may receive an image frame Ft_Si generated and rendered in a designated state Si through a generator 1831 (e.g., the generator 311a in FIG. 3) and a renderer 1833 (e.g., the renderer 311b in FIG. 3) of an external electronic device 1830 (e.g., the electronic device 300 in FIG. 3) from the external electronic device 1830 through a network. The designated state may indicate an execution state of an application related to an image frame and may include an initial state S1 and states (e.g., S2, S3, or S4) changed according to reception of a user input. A variable "i" of "Si" indicating the designated state may correspond to a natural number and may indicate the order of states. A variable "t" of "Ft_Si" indicating the image frame may indicate a time and "i" may correspond to a natural number and may indicate the order. For example, "Ft_Si" may indicate an image generated and rendered at time "t" in state "i".

In an embodiment, the electronic device 1810 may obtain a user input through an input device 1811 (e.g., the input device 1510 in FIG. 15). In addition, the electronic device 1810 may generate an input event Et corresponding to the obtained user input. A variable "t" of "Et" indicating the input event may indicate a time.

As shown in FIG. 18, the electronic device 1810 may receive, at a second time (t=3), a first image frame F2_S1 generated and rendered at a first time (t=2) in a first state (S1) 1851 of an external electronic device 1830, and display the received first image frame 1871 on a display 1813 (e.g., the display 1530 in FIG. 15).

In a state in which the first image frame 1871 is displayed, the electronic device 1810 may generate a first input event (E3) 1893 corresponding to the first user input obtained at the second time (t=3) through the input device 1811. The electronic device 1810 may transmit the generated first input event 1893 to the external electronic device 1830, and the external electronic device 1830 may switch the first state 1851 to a second state 1852 according to the first input event 1893 and generate and render a second image frame (F5_S2) 1872 according to the first input event 1893 at a third time (t=5) in the second state 1852. Similarly, the electronic device 1810 may generate a second input event (E4) 1894 corresponding to a second user input and a third input event (E5) 1895 corresponding to a third user input, the second input event and the third input event being obtained at a fourth time (t=4) and the third time (t=5), respectively, through the input device 1811, and each of the generated second input event 1894 and the third input event 1895 may be transmitted to the external electronic device 1830. Here, the external electronic device 1830 may switch from the second state 1852 to a third state 1853 according to the second input event 1894, generate and render a third image frame (F6_S3) 1873 according to the second input event 1894 at a fifth time (t=6) in the third state 1853, switch from the third state 1853 to a fourth state 1854 according to the third input event 1895, and generate and render a fourth image frame (F7_S4) 1874 according to the third input event 1895 at a sixth time (t=7) in the fourth state 1854.

In an embodiment, the electronic device 1810 may receive an image frame according to an input event from the external electronic device 1830. For example, the electronic device 1810 may receive the second image frame 1872 according to the first input event 1893 at the fifth time (t=6) from the external electronic device 1830, receive the third image frame 1873 according to the second input event 1894 at the sixth time (t=7), and receive the fourth image frame 1874 according to the third input event 1895 at a seventh time (t=8). By way of example, assuming that 1 frame time is about 33 ms based on 30 FPS, a time required to transmit data through the network is 1 frame time, and a time required for the external electronic device 1830 to generate and render an image frame is also 1 frame time, after an input event (e.g., the third input event 1895) according to a user input is generated (e.g., generated at the third time (t=5)), an image frame (e.g., the fourth image frame 1874) according to the input event may take about 99 ms, which is 3 frame times (e.g., the seventh time (t=8)).

In an embodiment and referring to FIG. 19, the electronic device 1810 may predict an input event through an event prediction module 1815 (e.g., the event prediction module 1573 in FIG. 15). After generating the first input event 1893 corresponding to the first user input obtained at the second time (t=3), the electronic device 1810 may predict at least one user input (e.g., the second user input (corresponding to 1894) and/or the third user input (corresponding to 1895)). According to an embodiment, the electronic device 1810 may generate a prediction input event corresponding to the at least one user input, based on the first image frame 1871 and/or the first input event 1893. FIG. 19 illustrates a state in which the electronic device 1810 predicts the second user input (corresponding to 1894) to generate a first prediction input event (E4') 1894-1, and predicts the third user input (corresponding to 1895) to generate a second prediction input event (E5') 1895-1.

Thereafter, the electronic device 1810 may transmit each of the first prediction input event 1894-1 and the second prediction input event 1895-1 to the external electronic device 1830. In this case, the external electronic device 1830 may switch from the second state 1852 to the third state 1853 according to the first prediction input event 1894-1, generate and render a fifth image frame (F5_S3) 1873-1 according to the first prediction input event 1894-1 at an eighth time (t=5.5) in the third state 1853, switch from the third state 1853 to the fourth state 1854 according to the second prediction input event 1895-1, and generate and render a sixth image frame (F5_S4) 1874-1 according to the second prediction input event 1895-1 at the eighth time (t=5.5) in the fourth state 1854.

In an embodiment, the electronic device 1810 may receive an image frame according to a prediction input event from the external electronic device 1830. For example, the electronic device 1810 may receive the fifth image frame 1873-1 according to the first prediction input event 1894-1 at a ninth time (t=6.5) from the external electronic device 1830, and receive the sixth image frame 1874-1 according to the second prediction input event 1895-1 at the ninth time (t=6.5). For example, assuming that a time taken to predict at least one (future) input event (e.g., the first prediction input event 1894-1 or the second prediction input event 1895-1) is smaller than 1 frame time (e.g., about 0.5 frame time) in the electronic device 1810, a time taken to receive an image frame (e.g., the fifth image frame 1873-1 or the sixth image frame 1874-1) according to the prediction input event 1894-1 or 1895-1 from the external electronic device 1830 may be 1.5 frame times (t=8-6.5) faster than a time taken to receive an image frame (e.g., the third image frame 1873 or the fourth image frame 1874) according to an input event (e.g., the second input event 1894 or the third input event 1895) generated to correspond to an actual obtained user input.

In an embodiment and referring to FIG. 20, the electronic device 1810 may generate a prediction image frame based on the prediction input event through an image prediction module 1817 (e.g., the generator 273*b* in FIG. 2). For example, the electronic device 1810 may generate the prediction image frame by applying the prediction input event to the first image frame 1871. FIG. 20 illustrates a state in which the electronic device 1810 generates a first prediction image frame (F'_E4") 1873-2 based on the first prediction input event 1894-1 and generates a second prediction image frame (F'_E5') 1874-2 based on the second prediction input event 1895-1. For example, assuming that a time taken to generate the prediction input event by the electronic device 1810 is 0.5 frame times and a time taken to generate the prediction image frame by the electronic device 1810 is 1 frame time, the electronic device 1810 may generate the first prediction image frame 1873-2 at a tenth time (t=4.5) and generate the second prediction image frame 1874-2 at the eighth time (t=5.5). For example, the first prediction image frame 1873-2 and the second prediction image frame 1874-2 may be generated before receiving an image frame (e.g., the third image frame 1873 or the fourth image frame 1874) according to an input event (e.g., the second input event 1894 or the third input event 1895) generated to correspond to an actual obtained user input. Accordingly, the electronic device 1810 may predict an image frame on the display 1813 without latency when a user input actually occurs. For example, the electronic device 1810 may generate an input event corresponding to the obtained user input, and 0.5 frame times later, display the prediction image frame on the display 1813 so as to prevent the user from recognizing the latency time.

The electronic device according to various embodiments may be one of various types of electronic devices. The electronic devices may include, for example, a portable communication device (e.g., a smartphone), a computer device, a portable multimedia device, a portable medical device, a camera, a wearable device, and/or a home appliance. According to an embodiment, the electronic devices are not limited to those described above.

It should be appreciated that various embodiments and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., hardwired), wirelessly, and/or via a third element.

As used in connection with various embodiments of the disclosure, the term "module" may include a unit implemented in hardware, software, and/or firmware, and may interchangeably be used with other terms, for example, "logic," "logic block," "part," or "circuitry". A module may be a single integral component, and/or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and/or where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, and/or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Moreover, the embodiments or parts of the embodiments may be combined in whole or in part without departing from the scope of the invention. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
an input device;
a display;
a communication circuit;
at least one processor operatively connected to the input device, the display, and the communication circuit; and
a memory storing instructions,
wherein the instructions, when executed by the at least one processor, cause the electronic device to:
  receive a first image frame from an external electronic device through the communication circuit;
  display the received first image frame through the display;
  receive a first user input through the input device;
  predict a second user input based on the received first image frame and the received first user input;
  generate a prediction input event corresponding to the predicted second user input;
  transmit information on the prediction input event to the external electronic device through the communication circuit;
  receive a second image frame according to the prediction input event from the external electronic device through the communication circuit; and
  display the received second image frame through the display,
  wherein, if a third user input consecutive to the first user input and corresponding to the predicted second user input is received, the processor is configured to display the second image frame.

2. The electronic device of claim 1, wherein the processor is configured to:
  transmit input information about the first user input to the external electronic device through the communication circuit;
  receive a third image frame according to the first user input from the external electronic device through the communication circuit; and
  display the third image frame before displaying the second image frame.

3. The electronic device of claim 1, wherein the processor is configured to:
  transmit input information about the third user input to the external electronic device through the communication circuit;
  receive a third image frame according to the third user input from the external electronic device through the communication circuit; and
  display the third image frame after displaying the second image frame.

4. The electronic device of claim 1, wherein the processor is configured to generate the prediction input event further based on an artificial intelligence-based first learning model by using the received first image frame and the received first user input.

5. The electronic device of claim 4, wherein, if a third user input that is consecutive to the first user input and corresponds to the predicted second user input is received, the processor is configured to:
  compare and analyze the prediction input event and an input event corresponding to the third user input; and
  apply a result of the comparison and analysis to the artificial intelligence-based first learning model.

6. The electronic device of claim 4, wherein, if the first image frame configures a screen of a designated game, the processor is configured to:
  obtain a parameter by applying a motion of a predicted object and a characteristic of an image frame responsive to an input of the first image frame and information related to the first user input to an artificial intelligence-based second learning model which has learned a motion of an object according to user input and a characteristic of an image frame based on characteristic information of the designated game; and
  tune the first learning model by using the obtained parameter.

7. The electronic device of claim 1, wherein the processor is configured to determine whether to generate the prediction input event through an artificial intelligence-based learning model using input information about the first user input.

8. An image frame processing method of an electronic device, the method comprising:
  receiving a first image frame from an external electronic device through a communication circuit of the electronic device;
  displaying the received first image frame through a display of the electronic device;
  receiving a first user input through an input device of the electronic device;
  predicting a second user input based on the first image frame and the first user input;
  generating a prediction input event corresponding to the second user input;
  transmitting information on the prediction input event to the external electronic device through the communication circuit;
  receiving a second image frame according to the prediction input event from the external electronic device through the communication circuit; and
  displaying the second image frame by the display,
  wherein, if a third user input consecutive to the first user input and corresponding to the predicted second user input is received, the displaying of the received second image frame comprises displaying the received second image frame through the display.

9. The method of claim 8, further comprising:
  transmitting input information about the first user input to the external electronic device through the communication circuit;
  receiving a third image frame according to the first user input from the external electronic device through the communication circuit; and
  displaying the third image frame before displaying the second image frame through the display.

10. The method of claim 8, further comprising:
  transmitting input information of the third user input to the external electronic device through the communication circuit;
  receiving a third image frame according to the third user input from the external electronic device through the communication circuit; and
  displaying the third image frame after displaying the second image frame through the display.

11. The method of claim 8, wherein generating the prediction input event comprises generating the prediction input event based on an artificial intelligence-based first learning model using the first image frame and the first user input.

12. The method of claim 11, further comprising:
  if a third user input consecutive to the first user input and corresponding to the predicted second user input is received, comparing and analyzing the prediction input event and an input event corresponding to the received third user input; and applying a result of the comparison and analysis to the artificial intelligence-based first learning model.

13. The method of claim 8, further comprising:

if the first image frame configures a screen of a designated game, obtaining a parameter by applying a motion of a predicted object and a characteristic of an image frame responsive to an input of the first image frame and information related to the first user input to an artificial intelligence-based second learning model which has learned a motion of an object according to user input and a characteristic of an image frame based on characteristic information of the designated game; and tuning the first learning model by using the obtained parameter.

14. An electronic device comprising:

an input device;

a display;

a communication circuit;

at least one processor operatively connected to the input device, the display and the communication circuit and;

a memory storing instructions, wherein the instructions, when executed by the at least one processor, cause the electronic device to:

receive a first image frame from an external electronic device through the communication circuit;

display the received first image frame through the display;

receive a first user input through the input device;

predict a second user input based on the received first image frame and the received first user input;

generate a prediction input event corresponding to the predicted second user input;

generate a prediction image frame based on the generated prediction input event; and display the prediction image frame through the display, wherein, if a third user input consecutive to the first user input and corresponding to the predicted second user input is received, the processor is configured to display the prediction image frame.

15. The electronic device of claim 14, wherein the processor is configured to:

transmit input information about the first user input to the external electronic device through the communication circuit;

receive a second image frame according to the first user input from the external electronic device through the communication circuit; and display the second image frame before displaying the prediction image frame.

16. The electronic device of claim 14, wherein the processor is configured to:

transmit input information about the third user input to the external electronic device through the communication circuit;

receive a second image frame according to the third user input from the external electronic device through the communication circuit; and display the second image frame after displaying the prediction image frame.

17. The electronic device of claim 14, wherein the processor is configured to generate the prediction input event further based on an artificial intelligence-based learning model by using the received first image frame and the received first user input.

* * * * *